United States Patent
Li et al.

(10) Patent No.: US 12,024,961 B2
(45) Date of Patent: Jul. 2, 2024

(54) REMOTE INTELLIGENT ACTIVE DRILLING PRESSURE CONTROL SYSTEM AND METHOD

(71) Applicant: Southwest Petroleum University, Chengdu (CN)

(72) Inventors: Gao Li, Chengdu (CN); Hongtao Li, Chengdu (CN); Yijian Chen, Chengdu (CN); Dong Xiao, Chengdu (CN); Jun Jiang, Chengdu (CN); Wenhe Xia, Chengdu (CN); Yongjie Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 17 days.

(21) Appl. No.: 18/151,915

(22) Filed: Jan. 9, 2023

(65) Prior Publication Data
US 2023/0235635 A1    Jul. 27, 2023

(30) Foreign Application Priority Data
Jan. 25, 2022   (CN) .......................... 202210085302.8

(51) Int. Cl.
*E21B 21/08*    (2006.01)
*E21B 33/06*    (2006.01)
*E21B 44/00*    (2006.01)

(52) U.S. Cl.
CPC .............. *E21B 21/08* (2013.01); *E21B 33/06* (2013.01); *E21B 44/00* (2013.01)

(58) Field of Classification Search
CPC .......... E21B 21/08; E21B 33/06; E21B 44/00
See application file for complete search history.

(56) References Cited

U.S. PATENT DOCUMENTS

| | | | |
|---|---|---|---|
| 2012/0305314 A1* | 12/2012 | Maida, Jr. .............. | E21B 44/00 175/50 |
| 2018/0283157 A1* | 10/2018 | Hadi ....................... | E21B 47/06 |
| 2021/0108499 A1* | 4/2021 | Aarsland ................ | E21B 44/00 |

* cited by examiner

*Primary Examiner* — Christopher J Sebesta
(74) *Attorney, Agent, or Firm* — Muncy, Geissler, Olds & Lowe, P.C.

(57) ABSTRACT

A remote intelligent active drilling pressure control system and method. The system includes a drilling pump, a rotary blowout preventer, a ground simple throttle control manifold, a wellhead back pressure compensation manifold, a graded filling device, a downhole storage-type pressure measuring device, a ground multi-parameter online monitoring system, a drilling hydraulic calculation system, an MPD intelligent control platform and a remote monitoring and control system. The present invention provides a wellbore pressure control thought of "plugging and control integration", improves the pressure resistance of a formation by circularly plugging while drilling, realizes active control of a wellbore pressure, effectively broadens a "drilling safety density window" of the formation, and reduces the requirements on the pressure control precision of a wellbore pressure control device.

10 Claims, 9 Drawing Sheets

REMOTE INTELLIGENT ACTIVE DRILLING PRESSURE CONTROL SYSTEM AND METHOD

TECHNICAL FIELD

The present invention relates to the field of drilling for oil and natural gas exploration and development, in particular to a remote intelligent active drilling pressure control method and system.

BACKGROUND ART

With the continuous deepening of oil and gas exploration and development, the field of exploration and development is gradually turning to complex formations such as deep layers, deep water and unconventional formations. Generally, a "safety density window" of complex formations is relatively narrow, and a series of complex drilling problems such as well kicking, well leakage, and jamming are prone to occur when conventional drilling techniques are applied, and have become the technical bottlenecks that seriously affect and restrict the oil and gas exploration and development in complex formations.

A managed pressure drilling (MPD) technology is a new drilling technology developed in recent years. Its core is to regulate a wellhead back pressure in real time through a corresponding equipment system, so as to indirectly control a bottom hole pressure and keep it always in a "drilling safety density window", thereby effectively preventing and controlling well leakage and overflow, avoiding downhole complex situations and greatly shortening the production time. The MPD technology has become the most effective technical means to solve the problem of wellbore pressure control in complex formation drilling. Since the inception of the MPD technology, after years of development, the technical system has become more and more perfect, and the control accuracy of a wellbore pressure has continued to improve. The control accuracy of a bottom hole pressure of a developed fine MPD system can reach ±0.35 MPa, which has become a new weapon of safe and efficient drilling devices, and related devices have also been localized.

At present, the fine MPD technology has been applied on a large scale in the field and achieved good application results, but the existing fine MPD technology still has the following problems.

1. The existing fine MPD system can only passively regulate the bottom hole pressure according to a "drilling safety density window" of a formation. The control accuracy of the bottom hole pressure of equipment of the system is up to +0.35 MPa, which has reached the extreme and is hardly further improved. When the drilling operation encounters multi-pressure series of strata, the "drilling safe density window" of the formation may be lower than 0.35 MPa, or even a "zero safe density window". Secondly, during a drilling process of a horizontal well, if a horizontal well section is too long, the "drilling safety density window" of the formation will be too narrow or even zero, which is easy to cause downhole complex situations such as upward ejection and downward leakage, and has become an important factor that affects the extension capacity of a horizontal section of horizontal well drilling. At this time, the regulation requirements of safety drilling for the bottom hole pressure have exceeded a regulation limit of the fine MPD system. Even if the most advanced fine MPD system is applied, it is also difficult to overcome complex downhole conditions such as well leakage and overflow. A "passive" pressure regulation mode of the existing fine MPD system seriously limits its application and promotion, which is a major defect in technics.

2. The existing fine MPD system mainly includes a rotary blowout preventer, a ground automatic throttle manifold, a back pressure compensation device, a downhole pressure while drilling (PWD) testing system, ground control software, etc., as shown in FIG. 1. A ground throttle control system consists of various gate valves, hydraulically controlled throttle valves, main throttle manifolds, auxiliary throttle manifolds, Coriolis flowmeters, pressure sensors, hydraulically controlled throttle control consoles, control boxes, etc. The back pressure compensation device consists of an electric triplex plunger pump, an AC motor, a water supply pipeline, a water drainage pipeline, a Coriolis flowmeter, etc. The ground automatic throttle manifold and the back pressure compensation device are complex in structure. The overall structure adopts a skid-mounted structure, coupled with a supporting numerical control room, etc. The whole set of fine MPD system is quite large, and the equipment occupies a large area. In addition, the whole set of equipment cannot be divided into independent units used alone, such that the whole set of equipment must be installed on a well site, which imposes more stringent requirements on the size of the well site and severely limits the popularization and application of the fine MPD technologies in offshore drilling, mountain drilling and other scenarios.

3. In order to achieve the ultimate pursuit for the control accuracy of the bottom hole pressure, the fine MPD system is equipped with expensive equipment such as a downhole PWD testing system, a Coriolis flowmeter, and a special back pressure compensation device, which objectively improves the accuracy of pressure control significantly and the control ability of the MPD technology to cope with the wellbore pressure, but also increases the overall operating cost of the MPD technology. Therefore, it is difficult to meet the ultimate pursuit for cost reduction and effect increase in drilling operations under a new normal of low oil prices, which limits the popularization and application of this technology.

4. The existing fine MPD system relies on a special back pressure compensation device to apply a back pressure when the circulation is stopped. The back pressure compensation device has a relatively small displacement, which cannot meet the slurry injection requirements in the process of vicious well leakage and long-term tripping; and the water feeding efficiency of the back pressure compensation device is not high, resulting in unstable outlet flow and difficulty to accurately control the wellhead back pressure. So, the back pressure compensation device needs to be frequently started in the field operation, which also causes a frequency converter and a control system to fail easily. In addition, the rated power of a motor of the back pressure compensation device is relatively high, and the drilling team needs to provide a 400-kilowatt generator dedicated to supply power, which, however, cannot be provided by some drilling teams, so additional equipment is needed.

5. The valve position control of an automatic throttle manifold for fine MPD is performed in a hydraulically controlled mode. An imported hydraulically controlled system has high cost, and the cost of a single valve thereof is as high as more than one million yuan, which is not conducive to popularization and application. A hydraulically controlled system made in China has slow response speed and large pressure control fluctuations, and thus there is still a certain distance from the requirements of fine pressure control.

6. The current fine MPD system can only be passively controlled based on engineering parameters measured while drilling, without any closed-loop control combined with engineering geological research data, etc. In addition, the current fine MPD system has relatively high quality requirements for on-site operators due to high dependency on operators to input data and commands irregularly, and thus fails to be controlled intelligently, which may cause a poor pressure control effect due to operator's misoperation or input of inappropriate instructions. In addition, the current fine MPD systems generally do not have a remote control function, some of which are equipped with remote units, but most of them are limited to remote monitoring, without any remote control capability.

SUMMARY OF THE INVENTION

An object of the present invention is to overcome the deficiencies of the prior art and provide a remote intelligent active drilling pressure control method and system. The present invention can regulate a "drilling safety density window" of a formation while drilling, and realize active wellbore pressure control. The present invention can also solve the problem of excessive land occupancy in the current fine MPD, greatly reduces the operating cost in the MPD, and is beneficial to the popularization and application of the MPD technology. The present invention can also overcome the defects that a back pressure compensation device cannot meet the requirements of long-term slurry injection, frequent failures, unstable outlet flow, and the need to be equipped with a dedicated generator. The present invention can also overcome the problems of high cost, slow response speed and large pressure control fluctuation of a hydraulically controlled system of a ground automatic throttle control system, and can realize the intelligent remote closed-loop control of a drilling wellbore pressure.

In order to achieve the above object, the technical scheme adopted in the present invention is as follows:

A remote intelligent active drilling pressure control system, comprising a drilling pump, a rotary blowout preventer, a ground simple throttle control manifold, a wellhead back pressure compensation manifold, a graded filling device, a downhole storage-type pressure measuring device, a ground multi-parameter online monitoring system, a drilling hydraulic calculation system, an MPD intelligent control platform and a remote monitoring and control system, The ground multi-parameter online monitoring system comprises a logging data center, a data integration and processing system, and a vertical pressure sensor $P_1$, a pressure control manifold pressure sensor $P_2$, a pressure control manifold pressure sensor $P_3$, a pressure control manifold pressure sensor $P_4$, a pressure control manifold pressure sensor $P_5$, a pressure control manifold pressure sensor $P_6$, a pressure control manifold pressure sensor $P_7$, a pressure control manifold pressure sensor $P_8$, a casing pressure sensor $P_9$, a gas-liquid separator exhaust pipe pressure sensor $P_{10}$, a drilling fluid inlet flowmeter $F_1$, a drilling fluid outlet flowmeter $F_5$, a gas-liquid separator outlet pipe flowmeter $F_4$, a pressure control manifold flowmeter $F_2$ and a pressure control manifold flowmeter $F_3$ which are respectively connected to the data integration and processing system through a wireless local area network, a gas-liquid separator exhaust pipe gas flowmeter $F_6$, a filling tank flowmeter $F_7$, a slurry return branch drilling fluid rheological monitoring device $R_1$, a gas-liquid separator outlet pipe drilling fluid rheological monitoring device $R_2$, and a gas-liquid separator exhaust pipe gas component monitoring device; the logging data center is connected to the data integration and processing system through a communication port; the MPD intelligent control platform is connected to the remote monitoring and control system; the data integration and processing system is respectively connected to the remote monitoring and control system, the drilling hydraulic calculation system and the MPD intelligent control platform through communication network equipment; and the downhole storage-type pressure measuring device is used to measure and store downhole temperatures and pressures, and is mounted in a drill collar at the upper part of a drill bit.

The ground simple throttle control manifold comprises: electrically controlled throttle valves, gate valves, and a throttling and diversion manifold system; the electrically controlled throttle valves and the gate valves are respectively mounted in the throttling and diversion manifold system; the gate valves comprise a manual gate valve $SV_3$, a manual gate valve $SV_8$, a manual gate valve $SV_9$, a manual gate valve $SV_{10}$, a manual gate valve $SV_{12}$, a manual gate valve $SV_{13}$, and a manual gate valve $SV_{15}$; the electrically controlled throttle valves comprise an electrically controlled throttle valve $V_1$, an electrically controlled throttle valve $V_2$ and an electrically controlled throttle valve $V_3$; the data integration and processing system is respectively connected to the electrically controlled throttle valve $V_1$, the electrically controlled throttle valve $V_2$ and the electrically controlled throttle valve $V_3$; the throttling and diversion manifold system comprises a branch I, a branch II, a branch III, a branch IV and a branch V; the branch I, the branch II and the branch III are connected through a tee joint $T_6$; the branch IV is connected to the branch II through a tee joint $T_7$; the branch V is connected to the branch III through a tee joint $T_5$;

the pressure control manifold flowmeter $F_3$, the manual gate valve $SV_{15}$ and the pressure control manifold pressure sensor $P_8$ are mounted on the branch I; the manual gate valve $SV_{15}$ is connected to a well control throttle manifold through a tee joint $T_8$; the data integration and processing system is respectively connected to the pressure control manifold flowmeter $F_3$ and the pressure control manifold pressure sensor $P_8$;

the electrically controlled throttle valve $V_2$, the pressure control manifold flowmeter $F_2$, the manual gate valve $SV_{13}$, the pressure control manifold pressure sensor $P_4$ and the pressure control manifold pressure sensor $P_5$ are mounted on the branch II; the manual gate valve $SV_{13}$ is connected to the tee joint $T_7$; the pressure control manifold pressure sensor $P_4$ and the pressure control manifold pressure sensor $P_5$ are respectively mounted on both ends of the electrically controlled throttle valve $V_2$; the data integration and processing system is respectively connected to the electrically controlled throttle valve $V_2$ and the pressure control manifold flowmeter $F_2$;

the electrically controlled throttle valve $V_1$ and the manual gate valve $SV_9$ are mounted on the branch III; the pressure control manifold pressure sensor $P_6$ and the pressure control manifold pressure sensor $P_7$ are respectively mounted on both ends of the electrically controlled throttle valve $V_1$; the data integration and processing system is respectively connected to the electrically controlled throttle valve $V_1$, the pressure control manifold pressure sensor $P_6$ and the pressure control manifold pressure sensor $P_7$;

the manual gate valve $SV_3$, the manual gate valve $SV_{12}$, the electrically controlled throttle valve $V_3$, the pressure control manifold pressure sensor $P_2$ and the pressure control manifold pressure sensor $P_3$ are mounted on the branch IV; the manual gate valve $SV_3$ is connected to the well control throttle manifold through a tee joint $T_4$; the pressure control manifold pressure sensor $P_2$ and the pressure control manifold pressure sensor $P_3$ are respectively mounted on both ends of the electrically controlled throttle valve $V_3$; the data integration and processing system is respectively connected to the electrically controlled throttle valve $V_3$, the pressure control manifold pressure sensor $P_2$ and the pressure control manifold pressure sensor $P_3$; and the manual gate valve $SV_8$ and the manual gate valve $SV_{10}$ are mounted on the branch V; and the manual gate valve $SV_{10}$ is connected to a gas-liquid separator through a four-way joint $SC_4$.

The wellhead back pressure compensation manifold comprises: a drilling team slurry pump, a back pressure diversion manifold, and a manual gate valve $SV_{11}$; the back pressure diversion manifold comprises a branch $V_1$ which is connected to the drilling team slurry pump through a four-way joint $SC_1$, and a branch VII that connects a four-way joint $SC_1$ and a tee joint $T_7$; a manual gate valve $SV_{11}$ is mounted on the branch VII; the manual gate valve $SV_{11}$ is sequentially connected to the branch II, the branch III and the branch V of the ground simple throttle control manifold through the tee joint $T_7$; and the branch Vis connected to a vibrating screen through the four-way joint $SC_4$, or connected to the vibrating screen through the four-way joint $SC_4$ via the gas-liquid separator.

The graded filling device comprises a slurry suction pump, a filling tank, a feeder, a mixer, a filling tank electrically controlled throttle valve $V_4$, a feeding control system, a filling tank flowmeter $F_7$, a slurry suction pipeline, and a slurry injection pipeline; the filling tank is mounted on the slurry tank, and is connected with the slurry tank through the slurry suction pipeline; the filling tank is connected with a water pipeline on the drilling team slurry pump through the slurry injection pipeline; the slurry suction pump is mounted on the slurry suction pipeline; the filling tank electrically controlled throttle valve $V_4$ and the filling tank flowmeter $F_7$ are respectively mounted on the slurry injection pipeline; the mixer, the feeder and the feeding control system are respectively mounted on the filling tank; and the feeding control system is respectively connected with the mixer, the feeder and the slurry suction pump, and is connected with the MPD intelligent control platform through communication equipment.

The drilling hydraulic calculation system comprises a steady-state calculation module and a transient calculation module; the steady-state calculation module is configured to perform steady-state calculation on single-phase fluid or gas-liquid two-phase fluid of drilling fluid in an annulus and the drill string according to a preset steady-state calculation path to obtain steady-state drilling parameters on the preset steady-state calculation path; and the transient calculation module is configured to perform transient calculation on the gas-liquid two-phase fluid in the annulus and the drill string according to a preset transient calculation path to obtain transient drilling parameters on the preset transient calculation path.

The MPD intelligent control platform comprises: an MPD intelligent control terminal, a throttle control cabinet, a back pressure compensation control cabinet and a drilling server; the MPD intelligent control terminal is respectively connected with the throttle control cabinet and the back pressure compensation control cabinet; the throttle control cabinet is respectively connected with the electrically controlled throttle valve $V_1$, the electrically controlled throttle valve $V_2$, the electrically controlled throttle valve $V_3$ and a hydraulically controlled throttle valve on the well control throttle manifold; the back pressure compensation control cabinet is respectively connected with the electrically controlled throttle valve $V_1$ and the electrically controlled throttle valve $V_2$ which are connected and mounted with the wellhead back pressure compensation manifold; the MPD intelligent control terminal is connected to the drilling server; the MPD intelligent control terminal comprises an intelligent control module and an artificial control module; the intelligent control module is configured to learn and train drilling data collected by the ground multi-parameter online monitoring system through a machine learning intelligent algorithm to generate a pressure regulation instruction sample library under multiple working conditions of MPD, and perform intelligent pressure control according to the online monitoring data; and the artificial control module is configured to perform intelligent remote closed-loop control on a drilling wellbore pressure according to instructions from MPD staff.

The remote monitoring and control system comprises: a remote monitoring center, a data center, an expert workstation, a control center and a monitoring server; the remote monitoring center is connected with the MPD intelligent control system through communication network equipment; the data center is respectively connected to the remote monitoring center, the expert workstation and the monitoring server; the expert workstation is connected to the control center; the control center is connected with the MPD intelligent control terminal; the data center is configured to store all the monitored data, and store all data after drilling has been performed, as well as to train the machine learning intelligent algorithm of the MPD intelligent control terminal; and the expert workstation is equipped with engineering calculation analysis software, which is configured to directly transmit expert opinions and instructions to the MPD intelligent control terminal through the control center.

A remote intelligent active drilling pressure control method which is implemented by a remote intelligent active drilling pressure control system. The method includes the following steps:

S1: pre-inputting drilling parameters and engineering technical data to an MPD intelligent control system prior to drilling;

The drilling parameters include a well category, a well type, a well depth, a well body structure, a well trajectory, a displacement, a drilling pressure, a rotational speed, formation lithology, drilling fluid density and viscosity, reservoir parameters and the like, and the pre-inputted data is derived from a drilling engineering design. The engineering calculation data includes formation's three-pressure profiles (pore pressure, collapse pressure, leakage loss pressure), fracture parameters (development degree, fracture density, fracture width, etc.), plugging parameters and the like, and the pre-inputted data is derived from, but not limited to the drilling engineering design and/or engineering calculation and analysis software (Petrel, Landmark, etc.).

S2: entering the MPD construction operation, enabling ground multi-parameter real-time monitoring, and entering an intelligent identification operation mode: opening a manual gate valve $SV_1$, a manual gate valve $SV_2$, a manual gate valve $SV_3$, a manual gate valve $SV_{15}$ and a manual gate valve $SV_{10}$ first; closing a manual gate valve $SV_6$, a manual gate valve $SV_{11}$, a manual gate valve $SV_{16}$ and a manual gate valve $SV_{26}$ to enter a pressure control mode; turning on a ground multi-parameter online monitoring system, an MPD intelligent control system and a remote monitoring and control system, wherein the ground multi-parameter online monitoring system starts to collect monitoring data in real time, a drilling hydraulic calculation system calculates a bottom hole pressure in real time, and the MPD intelligent control system performs identification based on the collected well depth, hook load, drilling pressure, rotational speed, vertical pressure, casing pressure, drilling fluid inlet and outlet density and flow rate, and monitoring data for gas measurement values, and judges drilling operation modes in real time, supplemented by manual confirmation, wherein the drilling operation modes are divided into a normal drilling mode, a connection-making mode, a tripping-and-drilling mode and complex working modes, the complex working modes including a well leakage mode, an overflow mode and a well-kicking mode; and S3: carrying out a plugging operation while drilling to expand a "drilling safety density window" of the formation:

before the drilling operation encounters a leakage-prone formation, adding a while-drilling anti-leakage plugging agent to the pumped drilling fluid to enhance the pressure-bearing capability of the formation, improve a leakage loss pressure of the formation, prevents well leakage and expand the "drilling safety density window" of the formation, wherein the selection and ratio of the anti-leakage plugging agent are determined according to a leakage loss type of the leakage-prone formation and corresponding fracture parameters, and related parameters are analyzed and calculated by engineering calculation and analysis software installed in an expert workstation in the remote monitoring and control system before MPD, and automatically given by an MPD intelligent control terminal while drilling.

Further, the multi-slug graded plugging operation in the case of well leakage is performed to effectively plug the formation so as to form a dense and high-strength plugging zone, thereby improving the leakage loss pressure of the formation and expanding the "drilling safety density window" of the formation.

a principle of the multi-slug graded plugging operation comprises: grading plugging slurry according to the characteristics of formation fractures and particle sizes of plugging materials, and then injecting the plugging slurry into a wellbore in batches, so that the plugging materials enter the formation fractures in a graded and orderly manner to form a dense and effective plugging layer;

in the multi-slug graded plugging operation, the large-particle plugging material injected first forms a bridge at a throat position of the fracture, the second-grade plugging material is sequentially injected for filling, and the third-grade plugging material injected last is supplemented to form a dense plugging layer;

the configuration and pumping of the anti-leakage plugging agent and multi-slug graded plugging fluid are automatically configured and pumped by the graded filling device controlled by the MPD intelligent control terminal;

S4: intelligently regulating wellbore pressures under different operation modes, wherein the ground simple throttle control manifold is connected in parallel with the well control throttle manifold:

in the normal drilling mode: the drilling fluid returns through a side outlet of the rotary blowout preventer, flows through the branch IV, the branch II, the branch III and the branch V of the ground simple throttle control manifold in sequence, enters the gas-liquid separator through the four-way joint $SC_4$, and then returns to the slurry tank after the solid control by the vibrating screen; the electrically controlled throttle valve $V_2$ and the electrically controlled throttle valve $V_3$ are fully opened; an opening degree of the electrically controlled throttle valve $V_1$ is regulated to a preset pressure control value so as to maintain MPD;

in the connection-making mode: the manual gate valve $SV_{11}$ is opened; the manual gate valve $SV_{28}$ is closed; a flow channel on the wellhead back pressure compensation manifold is opened; the drilling fluid enters the wellhead back pressure compensation manifold through the four-way joint $SC_1$, flows through the branch $V_1$, the branch VII, the branch II, the branch III and the branch V of the back pressure diversion manifold in sequence, then enters the gas-liquid separator through the four-way joint $SC_4$, and then returns to the slurry tank after the solid control by the vibrating screen; the opening degrees of the electrically controlled throttle valve $V_1$, the electrically controlled throttle valve $V_2$ and the electrically controlled throttle valve $V_3$ are regulated by taking a preset back pressure compensation value as a benchmark to perform throttling and pressure control for back pressure compensation; the preset back pressure compensation value is an annulus circulation pressure loss calculated by the drilling hydraulic calculation system; at the end of the connection-making operation, the manual gate valve $SV_{11}$ is closed, and the manual gate valve $SV_{28}$ is opened to restore normal drilling;

in the tripping-and-drilling mode: the drilling team slurry pump is turned off, the remote intelligent active drilling pressure control system is always on and working, and the level of the annulus drilling fluid is monitored in real time through the ground multi-parameter online monitoring system; if the fluid level is abnormal, the drilling team slurry pump is turned on to perform slurry injection or back pressure compensation operation according to the abnormal fluid level;

in the well leakage mode: the opening degree of the electrically controlled throttle valve VI is regulated; a wellhead pressure control value is reduced gradually, and the leakage loss situation is monitored in real time; if the electrically controlled throttle valve $V_1$ has been fully opened and the well leakage still occurs when the wellhead back pressure has dropped to zero, the MPD intelligent control system intelligently regulates a displacement of the drilling fluid until the well leakage no longer occurs; if the well leakage still occurs when the displacement has been reduced to a minimum displacement required for wellbore purification, the MPD intelligent control system will automatically give a prompt to reduce the displacement of the drilling fluid or to carry out the plugging operation, provide a plugging plan and a recommended plan for main plugging parameters, and carry out the multi-slug graded plugging operation after manual confirmation;

if the slurry injection operation is required due to leakage loss without any slurry return, the drilling team slurry pump is turned off, the manual gate valve $SV_{28}$ is closed, and the manual gate valve $SV_{11}$ is opened; the drilling team slurry pump is then turned on; the opening degrees of the electrically controlled throttle valve $V_1$ and the electrically controlled throttle valve $V_3$ are regulated to carry out the slurry injection operation; the ground multi-parameter online monitoring system monitors the level of the drilling fluid in real time; when the slurry injection amount meets the requirements of the slurry injection operation, the drilling team slurry pump is turned off, the manual gate valve $SV_{11}$ is closed, the manual gate valve $SV_{28}$ is opened, and the flow channel of the drilling fluid restores to the normal drilling mode; and in the overflow and well-kicking mode: the opening degrees of the electrically controlled throttle valve $V_1$, the electrically controlled throttle valve $V_2$ and the electrically controlled throttle valve $V_3$ are reduced, and the wellhead back pressure value is increased gradually; the bottom hole pressure is controlled, and the overflow and well-kicking conditions are monitored in real time until the overflow or well-kicking disappears to restore to the normal drilling state; if the wellhead back pressure has risen to a maximum wellhead pressure specified by MPD standards, the MPD intelligent control system gives a prompt to end the MPD operation and switch to the conventional well control process, and on-site drilling engineers finally decide the next step; and if it is determined to end the MPD operation, the hydraulically controlled throttle valve is opened and the manual gate valve $SV_{23}$ is closed.

The throttle pressure control and back pressure compensation operation further comprises: performing single-stage throttling by regulating the opening degree of the electrically controlled throttle valve $V_1$, or performing multi-stage throttling by regulating the opening degrees of the electrically controlled throttle valve $V_1$, the electrically controlled throttle valve $V_2$ and the electrically controlled throttle valve $V_3$; and the MPD intelligent control system prioritizes single-stage throttling, but when a throttling pressure drop generated by the single-stage throttling is close to a maximum allowable throttle pressure drop of the electrically controlled throttle valve $V_1$, automatically turns on the multi-stage throttling.

A ground simple throttle control manifold is connected in parallel with a well control throttle manifold, and a flow channel of drilling fluid under different drilling operation modes is different from a wellhead pressure transmission channel, such that operations of throttle control, back pressure compensation and slurry injection are also different, which is mainly reflected in the regulation of electrically controlled throttle valves and hydraulically controlled throttle valves. In the tripping-and-drilling mode, the operation process is consistent with that in parallel connection. In the normal drilling mode, the well leakage mode and the overflow and well-kicking mode, the pressure control is implemented by regulating opening degrees of an electrically controlled throttle valve $V_1$ and a hydraulically controlled throttle valve. During the connection-making mode and the slurry injection operation without any slurry return, the pressure control is implemented by regulating the opening degrees of the electrically controlled throttle valve $V_1$, an electrically controlled throttle valve $V_2$ and the hydraulically controlled throttle valve.

A preset pressure control value and a back pressure compensation value of the throttle control and back pressure compensation operation are given by the high-precision drilling hydraulic calculation system and the MPD intelligent control system, and the regulation of the opening and closing and the opening degrees of the electrically controlled throttle valves and the turn-on and turn-off of a drilling team slurry pump are also controlled by the MPD intelligent control system.

The above step S3 is optional, and thus this operation may be selected not to be carried out under normal drilling conditions such as no well leakage, no well kicking and no overflow. A specific construction process of the multi-slug graded plugging operation is as follows: Step 1: the MPD intelligent control system controls a suction pump to be turned on to pump the drilling fluid in the slurry tank of a set volume into the filling tank, and grades plugging slurry according to screened plugging formulas, wherein first-grade large-grained elastic and rigid mixed materials are added first and mixed well; the concentration of the plugging slurry in the filling tank is automatically calculated according to the amount of the drilling fluid in the filling tank and the addition amounts of the plugging materials; A set volume accounts for one-half to two-thirds of the volume of the filling tank.

Step 2: after the plugging slurry in the filling tank is prepared well, the drilling team slurry pump is turned on, and the displacement of the pump is given by the MPD intelligent control system;

Step 3: the MPD intelligent control system controls the opening degree of an electrically controlled throttle valve $V_4$ of the filling tank, and adjusts an injection flow rate of the first-grade plugging slurry to control the concentration of the plugging slurry injected into the wellbore;

Step 4: after the pumping of the first-grade plugging slurry is completed, the drilling team slurry pump is turned off, and the operations of Steps 1, 2, and 3 are repeated to complete the filling and pumping of the second- and third-grade plugging materials in sequence;

Step 5: after all grades of plugging slurry are pumped, the electrically controlled throttle valve $V_4$ of the filling tank is closed, and the drilling fluid is continuously pumped to replace the slurry; and formulas of the plugging slurry at all grades need to be stored in the drilling intelligent control system in advance, and automatically screened according to the monitored leakage loss;

and the formulas of the plugging slurry can also be manually screened by field engineers.

The present invention has the following beneficial effects.
1. The present invention provides a wellbore pressure control thought of "plugging and control integration", improves the pressure resistance of a formation by circularly plugging while drilling, realizes active control of a wellbore pressure, effectively broadens the "drilling safety density window" of the formation, reduces the requirements on the pressure control precision of a wellbore pressure control device, solves the problem that a conventional MPD technology cannot copy with the situation that the "drilling safety density window" of the formation is extremely narrow or even zero, and expands the application range of the MPD technology.
2. A ground automatic throttle control system and a back pressure compensation device of a fine MPD drilling system are replaced by the ground simple throttle control manifold and the back pressure compensation manifold, such that the structure is simple, no skid-mounted device is required, the equipment occupancy area is small and the mounting is flexible. The problem that the conventional MPD system is hardly applied in scenarios having limited well site spaces such as mountain drilling and marine drilling.
3. The device of the present invention is not equipped with a downhole pressure while drilling (PWD) testing system, a Coriolis flowmeter and a special back pressure compensation device; and a downhole storage-type pressure measuring device is optional, which greatly reduces the cost of the MPD system.
4. An automatic filling device for plugging materials is used to realize automatic feeding and slurry configuration of the plugging materials.
5. The special back pressure compensation device is replaced by the drilling team slurry pump in combination with the back pressure compensation manifold, which avoids small displacement, low water feeding efficiency, easy failure and other problems, and can meet the slurry injection needs of vicious well leakage and long-term drilling, thereby achieving more stable outlet flow and more accurate control over the wellhead back pressure.
6. The electrically controlled throttle valve is adopted to replace a hydraulically controlled or pneumatically controlled throttle valve, which makes the response speed of the control system faster and the pressure control smoother.
7. The ground multi-parameter online monitoring system is used to realize online monitoring of multiple parameters, such as drilling engineering parameters and fluid, and real-time intelligent identification of drilling safety risks, so as to make the wellbore pressure control more forward-looking.
8. The MPD system of the present invention has a remote control function, and integrates drilling geological engineering research data and real-time online monitoring to achieve closed-loop intelligent control and reduce the operation risk caused by operator's misoperation.

Figure 1:
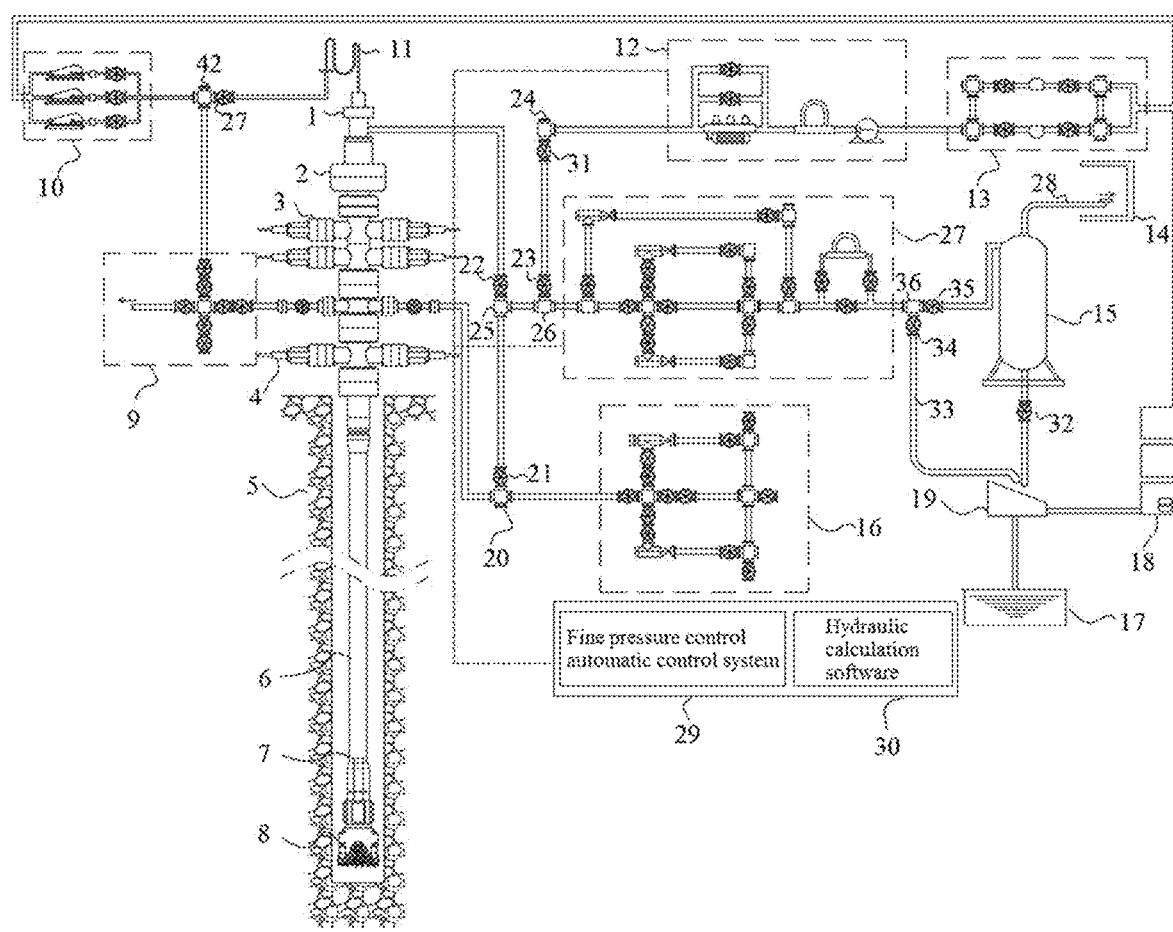
FIG. 1 is a schematic diagram of a working principle of an existing fine MPD system.

In drawings, reference symbols represent the following components:
1: rotary blowout preventer; 2: annular blowout preventer; 3: double-gate blowout preventer; 4: single-gate blowout preventer; 5: well wall; 6: drill string; 7: downhole pressure while drilling (PWD); 8: drill bit; 9: kill manifold; 10: drilling team slurry pump; 11: water hose; 12: wellhead back pressure compensation manifold; 13: filter set; 14: combustion pool; 15: gas-liquid separator; 16: well control throttle manifold; 17: slurry pool; 18: slurry tank; 19: vibrating screen; 20: tee joint $T_1$; 21: manual gate valve $SV_1$; 22: manual gate valve $SV_2$; 23: manual gate valve $SV_3$; 24: tee joint $T_2$; 25: tee joint $T_3$; 26: tee joint $T_4$; 27: automatic throttle control system; 28: gas-liquid separator exhaust pipe; 29: fine MPD automatic control system; 30: drilling hydraulic calculation system; 31: manual gate valve $SV_4$; 32: manual gate valve $SV_5$; 33: slurry return branch; 34: manual gate valve $SV_6$; 35: manual gate valve $SV_7$; 36: four-way joint $SC_4$; 37: tee joint $T_5$; 38: manual gate valve $SV_8$; 39: electrically controlled throttle valve $V_1$; 40: electrically controlled throttle valve $V_2$; 41: electrically controlled throttle valve $V_3$; 42: four-way joint $SC_1$; 43: drilling fluid inlet flowmeter $F_1$; 44: vertical pressure sensor $P_1$; 45: pressure control manifold pressure sensor $P_2$; 46: pressure control manifold pressure sensor $P_3$; 47: pressure control manifold pressure sensor $P_4$; 48: pressure control manifold pressure sensor $P_5$; 49: pressure control manifold pressure sensor $P_6$; 50: pressure control manifold pressure sensor $P_7$; 51: pressure control manifold pressure sensor $P_8$; 52: casing pressure sensor $P_9$; 53: pressure control manifold flowmeter $F_2$; 54: tee joint $T_6$; 55: manual gate valve $SV_9$; 56: manual gate valve $SV_{10}$; 57: gas-liquid separator exhaust pipe gas flowmeter $F_6$; 58: gas-liquid separator exhaust pipe gas component monitoring device; 59: drilling fluid outlet flowmeter $F_5$; 60: gas-liquid separator outlet pipe flowmeter $F_4$; 61: pressure control manifold flowmeter $F_3$; 62: automatic filling device for plugging materials; 63: tee joint $T_7$; 64: manual gate valve $SV_{11}$; 65: manual gate valve $SV_{12}$; 66: manual gate valve $SV_{13}$; 67: hydraulically controlled throttle valve; 68: manual throttle valve $J_1$; 69: manual gate valve $SV_{14}$; 70: manual gate valve $SV_{15}$; 71: tee joint $T_8$; 72: manual gate valve $SV_{16}$; 73: four-way joint $SC_2$; 74: tee joint $T_9$; 75: manual gate valve $SV_{17}$; 76: manual gate valve $SV_{18}$; 77: manual gate valve $SV_{19}$; 78: manual gate valve $SV_{20}$; 79: manual gate valve $SV_{21}$; 80: manual gate valve $SV_{22}$; 81: manual gate valve $SV_{23}$; 82: four-way joint $SC_3$; 83: manual gate valve $SV_{24}$; 84: manual gate valve $SV_{25}$; 85: logging data center; 86: data integration and processing system; 87: MPD intelligent control platform; 88: remote monitoring and control system; 89: gas-liquid separator outlet pipe drilling fluid rheological monitoring device $R_2$; 90: slurry return branch drilling fluid rheological monitoring device $R_1$; 91: downhole storage-type pressure measuring device; 92: gas-liquid separator exhaust pipe pressure sensor $P_{10}$; 93: manual gate valve $SV_{26}$; 94: manual gate valve $SV_{27}$, 95: manual gate valve $SV_{28}$; 96: feeder; 97: filling tank; 98: slurry suction pump; 99: mixer; 100: filling tank electrically controlled throttle valve $V_4$;

101: filling tank flowmeter $F_7$: 102: feeding control system; 103: slurry injection pipeline; 104: slurry suction pipeline.

DETAILED DESCRIPTIONS OF THE PREFERRED EMBODIMENTS

Embodiment 1

Figure 2:
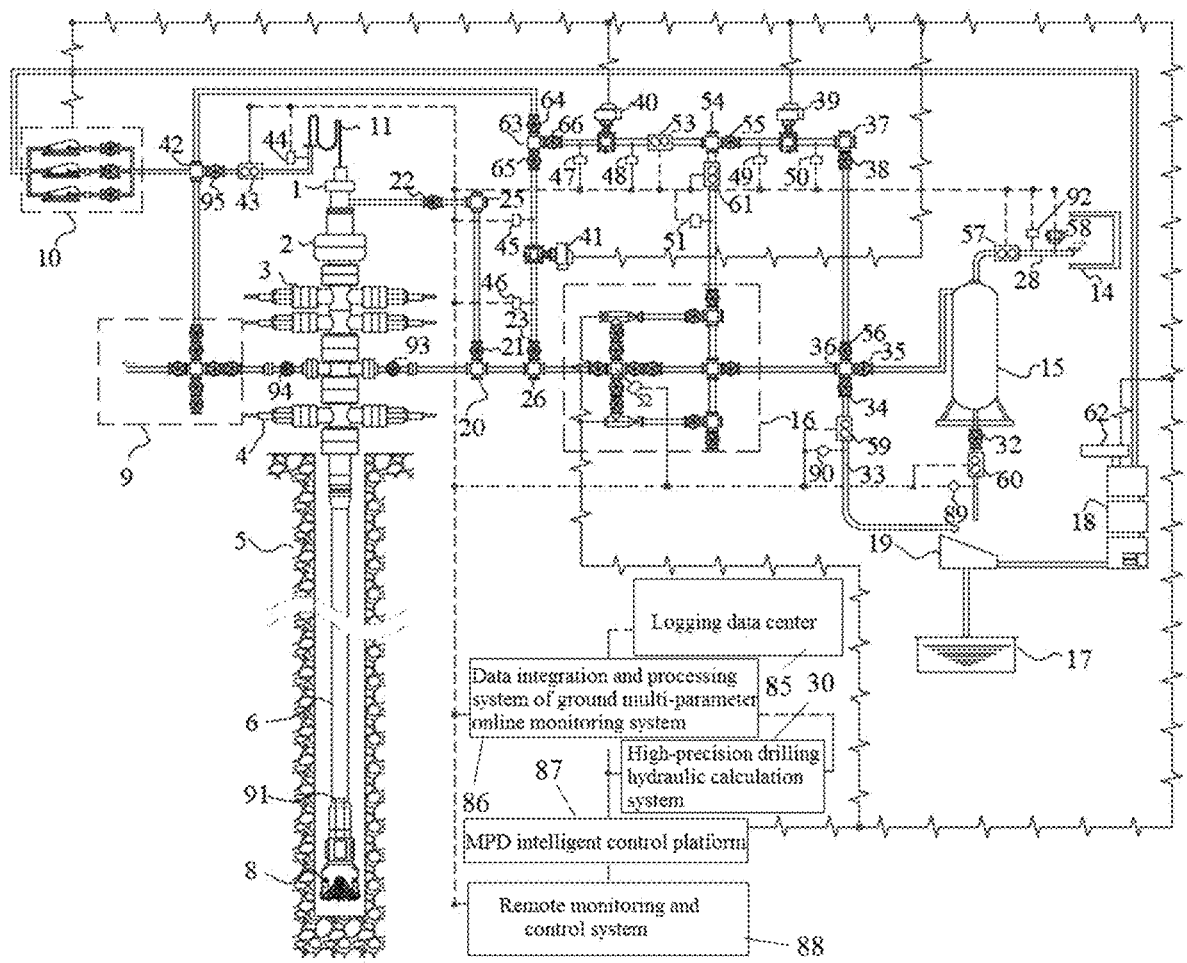
FIG. 2 is a schematic structural diagram of a remote intelligent active drilling pressure control system of the present invention.

FIG. 2 schematically shows a remote intelligent active drilling pressure control system according to an embodiment of the present invention.

As shown in FIG. 2, the remote intelligent active drilling pressure control system in this embodiment includes a ground multi-parameter online monitoring system, a rotary blowout preventer 1, a ground simple throttle control manifold, a wellhead back pressure compensation manifold, a graded filling device 62, a downhole storage-type pressure measuring device 91, a drilling hydraulic calculation system 30, an MPD intelligent control platform 87 and a remote monitoring and control system 88.

The remote intelligent active drilling pressure control system is not separately equipped with a gas-liquid separator, but makes use of a gas-liquid separator 15 standard equipped for a drilling team.

The ground multi-parameter online monitoring system includes a vertical pressure sensor $P_1$ 44, a pressure control manifold pressure sensor $P_2$ 45, a pressure control manifold pressure sensor $P_3$ 46, a pressure control manifold pressure sensor $P_4$ 47, a pressure control manifold pressure sensor $P_5$ 48, a pressure control manifold pressure sensor $P_6$ 49, a pressure control manifold pressure sensor $P_7$ 50, a pressure control manifold pressure sensor $P_8$ 51, a casing pressure sensor $P_9$ 52, a gas-liquid separator exhaust pipe pressure sensor $P_{10}$ 92, a drilling fluid inlet flowmeter $F_1$ 43, a drilling fluid outlet flowmeter $F_5$ 59, a gas-liquid separator outlet pipe flowmeter $F_4$ 60, a pressure control manifold flowmeter $F_2$ 53 and a pressure control manifold flowmeter $F_3$ 61, a gas-liquid separator exhaust pipe gas flowmeter $F_6$ 57, a slurry return branch drilling fluid rheological monitoring device $R_1$ 90, a gas-liquid separator outlet pipe drilling fluid rheological monitoring device $R_2$ 89, a gas-liquid separator exhaust pipe gas component monitoring device 58, and a data integration and processing system 86.

The ground multi-parameter online monitoring system includes an integrated logging system, and a data acquisition and monitoring system that comes with a drilling rig itself, wherein data is derived from a logging data center 85.

In the ground multi-parameter online monitoring system, there are 10 pressure sensors; 6 flowmeters, including 5 liquid phase flowmeters and one gas phase flowmeter; at least one gas phase component monitoring device; and at least one drilling fluid rheological monitoring device.

The pressure sensors, the flowmeters, and the drilling fluid rheological monitoring device in the ground multi-parameter online monitoring system are not necessarily fully configured, which can be selected according to the specific operation modes on the site, or can also be fully configured; and corresponding necessary parameters can be collected according to the needs.

The gas component monitoring device 58 on an exhaust pipe of the gas-liquid separator shall at least be able to measure components and contents of three kinds of gases, i.e., hydrogen sulfide, methane, and carbon dioxide.

The sampling frequencies of respective parameter acquisition sensors in the ground multi-parameter online monitoring system are kept consistent, and can be adjusted according to a data sampling frequency of an on-site integrated logging system.

The data tested by the pressure sensors, the flowmeters, the component analysis device, the drilling fluid rheological monitoring device and the like are connected to the data integration and processing system 86 through a wireless LAN. A wireless signal transmission module is mounted on each monitoring sensor, and a wireless signal receiving module is mounted on the data integration and processing system 86.

The data integration and processing center of the ground multi-parameter online monitoring system is installed with data integration software, which can realize the preprocessing, storage and unified platform display of multi-source large-capacity data such as online monitoring data and logging data.

The data integration and processing system 86 is provided with a port connected to a logging system, and is connected with the remote monitoring and control system 88 through communication network equipment. A sampling frequency of each monitoring device of the ground multi-parameter online monitoring system is consistent with a sampling frequency of the logging system. The data integration and processing system 86 is connected with the drilling hydraulic calculation system 30 and the MPD intelligent control platform 87.

A wireless communication mode for the data integration and processing system 86 connected with the logging data center 85, all online monitoring sensors of the present invention, the MPD intelligent control center 87, and the remote monitoring and control system 88 adopts any one of TCP/IP, OPC or MODBUS communication protocols, with a data format conforming to a well site data transmission specification format.

The ground multi-parameter online monitoring system can provide core basic data for the remote intelligent active control of a wellbore pressure in oil and gas drilling.

Figure 3:
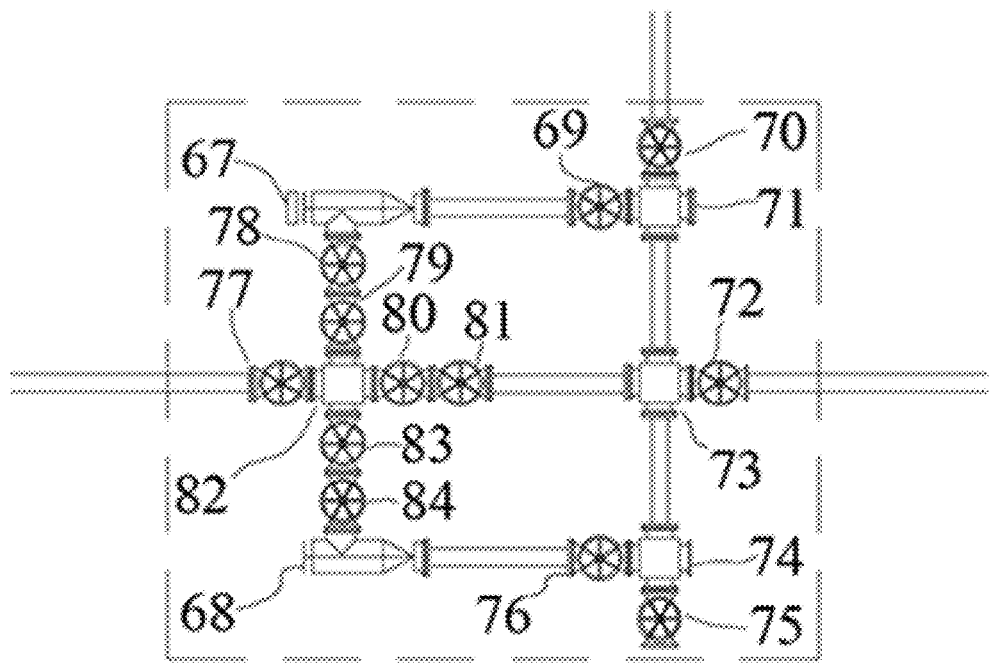
FIG. 3 is a schematic structural diagram of a well control throttle manifold.
Figure 4:
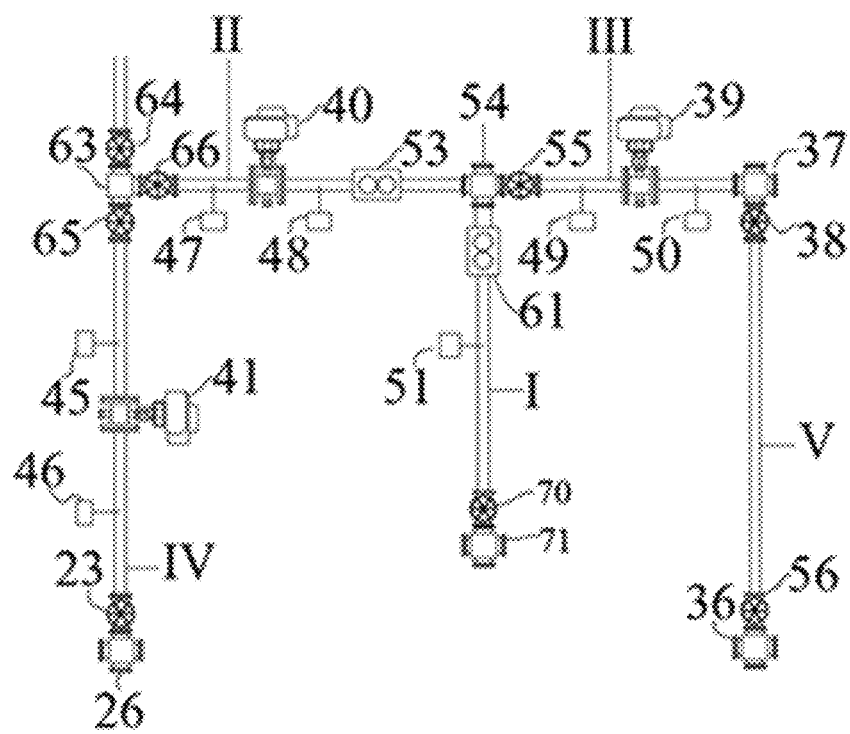
FIG. 4 is a schematic structural diagram of a throttling and diversion manifold system of the present invention.

As shown in FIG. 3 and FIG. 4, the ground simple throttle control manifold described in this embodiment includes a throttle guide manifold system, electrically controlled throttle valves, and gate valves. The throttle guide manifold system includes a branch I, a branch II and a branch III which are connected through a tee joint $T_6$ 54, a branch IV connected to the branch II through a tee joint $T_7$ 63, and a branch V connected to a four-way joint $SC_4$ 36 through a tee joint $T_4$ 37.

The branch I is equipped with a pressure control manifold flowmeter $F_3$ 61, a manual gate valve $SV_{15}$ 70, and a pressure control manifold pressure sensor $P_8$ 51, and connected to the well control throttle manifold 16 through a tee joint $T_8$ 71; the branch II is equipped with an electrically controlled manifold valve $V_2$ 40, a pressure control manifold flowmeter $F_2$ 53, a manual gate valve $SV_{13}$ 66, a pressure control manifold pressure sensor $P_4$ 47, and a pressure control manifold pressure sensor $P_5$ 48, and connected with the tee joint $T_7$ 63; the branch III is equipped with an electrically controlled throttle valve $V_1$ 39, a manual gate valve $SV_9$ 55, a pressure control manifold pressure sensor $P_6$ 49, and a pressure control manifold pressure sensor $P_7$ 50; the branch IV is equipped with manual gate valves $SV_3$ 23 and $SV_{12}$ 65, an electrically controlled throttle valve $V_3$ 41, and pressure control manifold pressure sensors $P_2$ 46 and $P_3$ 47, and connected to the well control throttle manifold 16 through a tee joint $T_4$ 26; and the branch V is equipped with a manual gate valve $SV_8$ 38 and a manual gate valve $SV_{10}$ 56, and connected to a drilling team gas-liquid separator 15 through a four-way joint $SC_4$.

Two pressure sensors are respectively mounted on both sides of each of the three electrically controlled throttle valves and configured to measure a throttle pressure drop of the corresponding electrically controlled throttle valve; the electrically controlled throttle valve is connected to the MPD intelligent control platform to achieve rapid regulation of the opening degrees, and the opening degrees can be regulated adaptively according to the throttle pressure drop.

The ground simple throttle control manifold described in the present invention is used to replace a ground automatic throttle control system 27 of the fine MPD system, and has two working modes of parallel connection and series connection with the well control throttle manifold 16, which can be switched by opening and closing the manual gate valve $SV_3$ 23, the hydraulically controlled throttle valve 67, and the manual gate valve $SV_{15}$ 70.

The manual gate valve $SV_3$ 23 and the manual gate valve $SV_{15}$ 70 are opened, the hydraulically controlled throttle valve 67 is closed, and the ground simple throttle control manifold is then connected in parallel with the well control throttle manifold 16. In the parallel connection mode, the well control throttle manifold 16 is in a closed state, and the throttle pressure control is performed by the ground simple throttle control manifold described in the present invention. At this time, in the ground simple throttle control manifold, the branch II, the branch III, the branch IV and the branch V have effective throttling effects, and the branch I is a closed branch in which no drilling fluid flows, and thus has no throttling effect.

The manual gate valves $SV_8$ 38, $SV_9$ 55, $SV_{12}$ 65, and $SV_{13}$ 66 on the ground simple throttle control manifold are in a normally opened state, and the electrically controlled throttle valves $V_1$ 39, $V_2$ 40, and $V_3$ 41 are also in a fully opened state under a non-pressure-controlled condition. The manual gate valves $SV_{14}$ 69, $SV_{19}$ 77, $SV_{20}$ 78, and $SV_{21}$ 79 on the well control throttle manifold are in a normally opened state, and the manual throttle valves $SV_{17}$ 75, $SV_{18}$ 76, $SV_{22}$ 80, $SV_{23}$ 81, $SV_{24}$ 83 and $SV_{25}$ 84 are also in a normally closed state.

Figure 7:
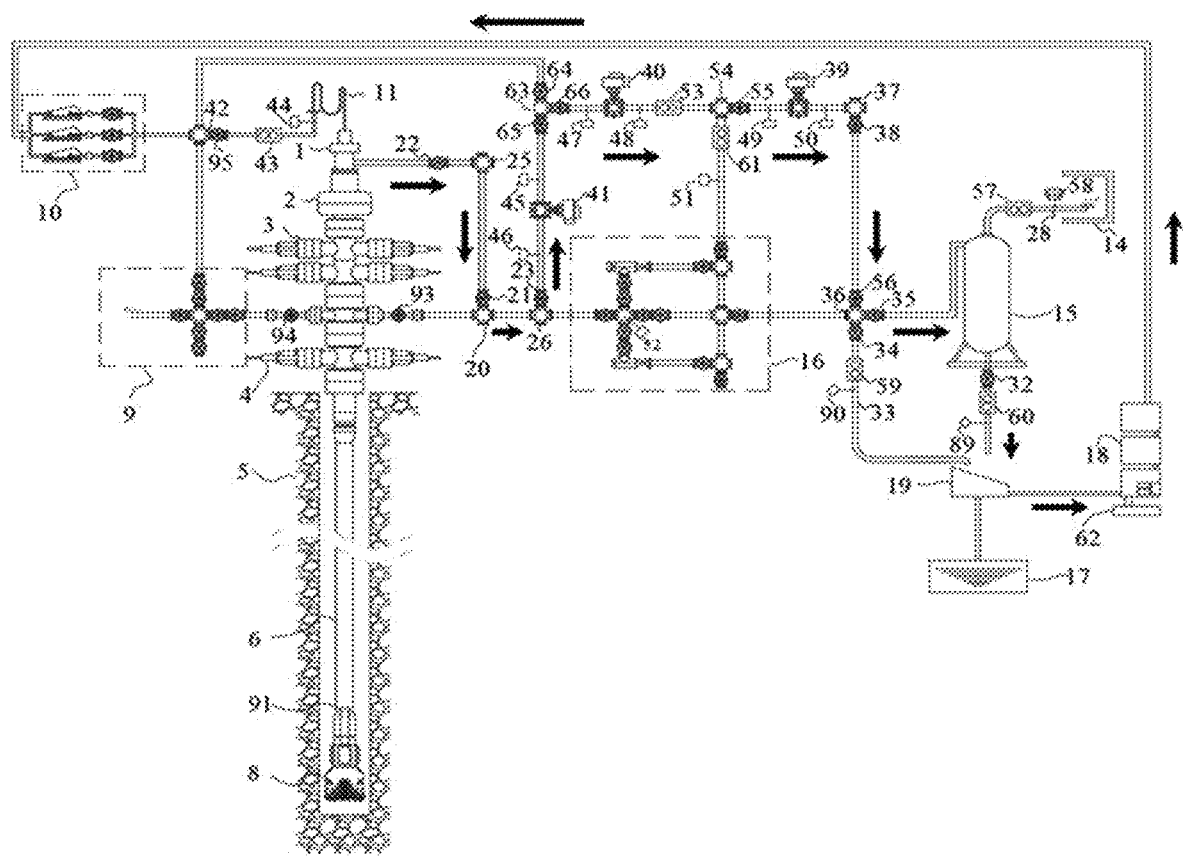
FIG. 7 is a schematic diagram of a flow path of drilling fluid when a ground simple throttle control manifold is connected in parallel with the well control throttle manifold in the present invention.

When the ground simple throttle control manifold is connected in parallel with the well control throttle manifold 16, a flow path of the drilling fluid is shown in FIG. 7. The specific path is as follows: the drilling fluid returns through the selected blowout preventer 1, enters the ground simple throttle control manifold through the manual gate valve $SV_1$ 22, the tee joint $T_3$ 25, the manual gate valve $SV_1$ 21, the tee joint $T_1$ 20 and the tee joint $T_4$ 26, sequentially flows through the branch IV, the branch II, the branch III and the branch V, and enters the gas-liquid separator 15 through the four-way joint $SC_4$ 36; and the separated drilling fluid flows through the vibrating screen 19, and then enters into a slurry tank 18 after solid control.

In the parallel connection mode, the three-stage throttle pressure control is realized through the electrically controlled throttle valve $V_3$ 41 on the branch IV, the electrically controlled throttle valve $V_2$ 40 on the branch and the electrically controlled throttle valve $V_1$ 39 on the branch, and the opening degrees of the three electrically controlled throttle valves are automatically controlled by the MPD intelligent control platform.

Further, the manual gate valve $SV_3$ 23 is closed, the manual gate valve $SV_{15}$ 70 and the hydraulically controlled throttle valve 67 are opened, and the ground simple throttle control manifold is then connected in series with the well control throttle manifold 16. In the series connection mode, in the ground simple throttle control manifold, the branch I, the branch III and the branch V have effective throttling effects, and the branch II and the branch IV are closed branches in which no drilling fluid flows, and thus have no throttling effect.

Figure 8:
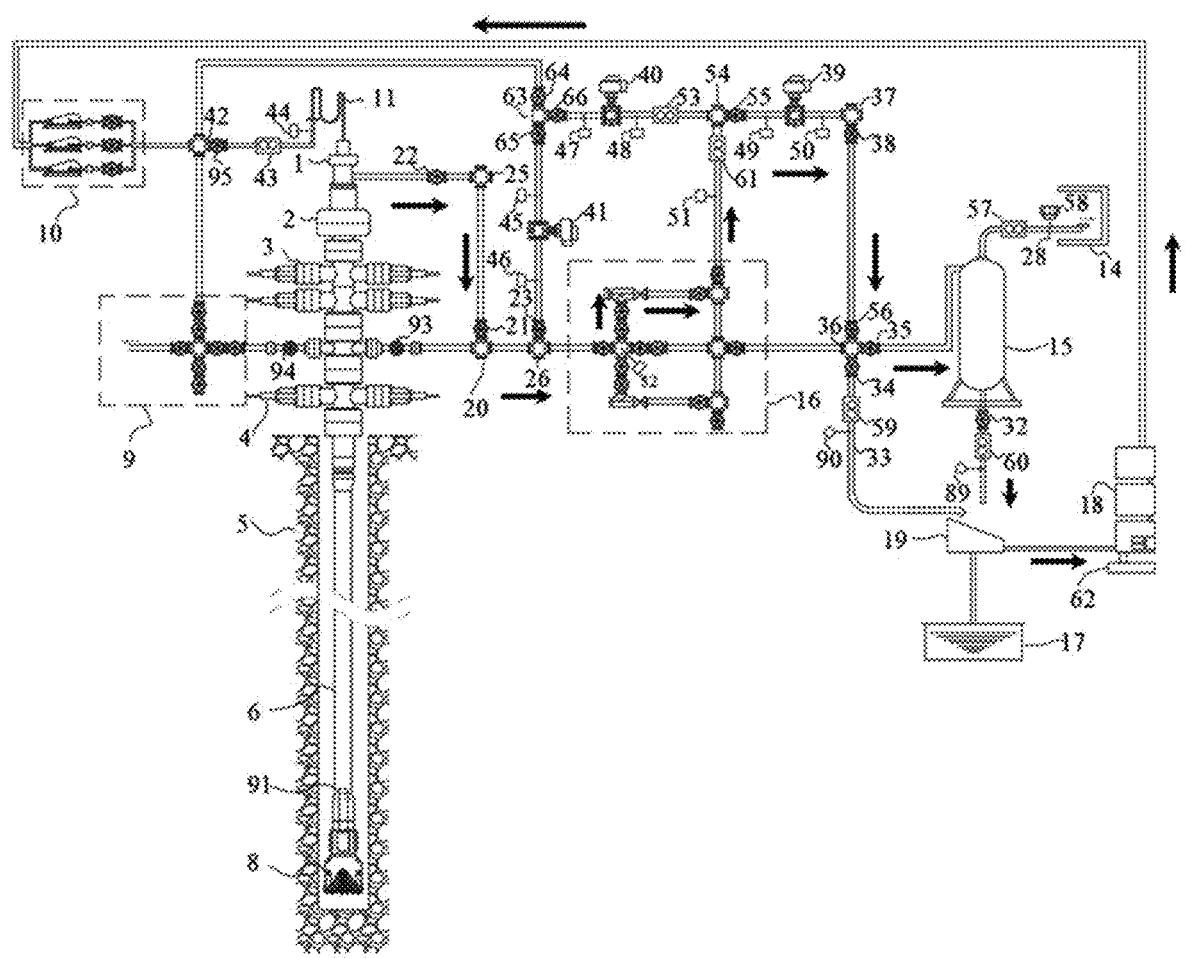
FIG. 8 is a schematic diagram of a flow path of the drilling fluid when the ground simple throttle control manifold is connected in series with the well control throttle manifold in the present invention.

When the ground simple throttle control manifold is connected in series with the well control throttle manifold 16, a flow path of the drilling fluid is shown in FIG. 8. The specific path is as follows: the drilling fluid returns through the selected blowout preventer 1, enters the well control throttle manifold 16 through the manual gate valve $SV_1$ 22, the tee joint $T_3$ 25, the manual gate valve $SV_1$ 21, the tee joint $T_1$ 20, the tee joint $T_4$ 26 and the manual gate valve $SV_{19}$ 77, enters the branch I of the ground simple throttle control manifold through the hydraulically controlled throttle valve 67 of the well control throttle manifold 16 and the tee joint $T_8$ 71, sequentially flows through the branch III and the branch V, and enters the gas-liquid separator 15 through the four-way joint $SC_4$ 36; and the separated drilling fluid flows through the vibrating screen 19, and then enters into the slurry tank 18 after solid control.

In the series connection mode, single-stage throttle pressure control can be achieved through the electrically controlled throttle valve $V_1$ 39 on the branch, and meanwhile, the hydraulically controlled throttle valve 67 on the well control throttle manifold can also be controlled to perform double-stage throttle pressure control. The opening degrees of the electrically controlled throttle valve $V_1$ 39 and the hydraulically controlled throttle valve 67 are automatically regulated by the MPD intelligent control platform.

The ground simple throttle control manifold of the present invention is mainly different from the prior art in that: a ground automatic throttle control system 27 of the existing fine MPD technology, which is composed of various gate valves, hydraulically controlled throttle valves (≥3), main throttle manifolds, auxiliary throttle manifolds, Coriolis flowmeters, pressure sensors, hydraulically controlled throttle control consoles, control boxes, and the like, adopts a skid-mounted structure as a whole, and is difficult to meet the application requirements in scenarios with limited well site spaces, such as mountain drilling and offshore drilling due to complete equipment structures and large occupied area; in addition, the standard equipped hydraulically controlled throttle valves, Coriolis flowmeters and other components are expensive, resulting in high cost of the whole set of ground automatic throttle control systems. The ground simple throttle control manifold described in the present invention is of a set of combined structure composed of manual gate valves, electrically controlled throttle valve pressure sensors, flowmeters and pipelines, and has the advantages of simple structure, flexible installation, no skid-mounted device, and small occupied area of equipment. In addition, in the ground simple throttle control manifold described in the present invention, the hydraulically controlled throttle valves are replaced with three electrically controlled throttle valves with relatively low cost, and the Coriolis flowmeter is replaced with a conventional liquid phase flowmeter, such that the equipment cost has been greatly reduced as a whole. It should be noted that although the maximum working pressure difference of a single electrically controlled throttle valve is lower than that of the hydraulically controlled throttle valve, the ground simple throttle control manifold realizes multi-stage throttle pressure control by means of the series connection (or parallel connection) of the three electrically controlled throttle valves or the series connection of one electrically controlled throttle valve and the well control throttle manifold, and has the overall pressure control capacity not weaker than the ground automatic throttle control system 27 in the prior art, thereby achieving a faster response speed of the electrically controlled throttle valves.

Figure 5:
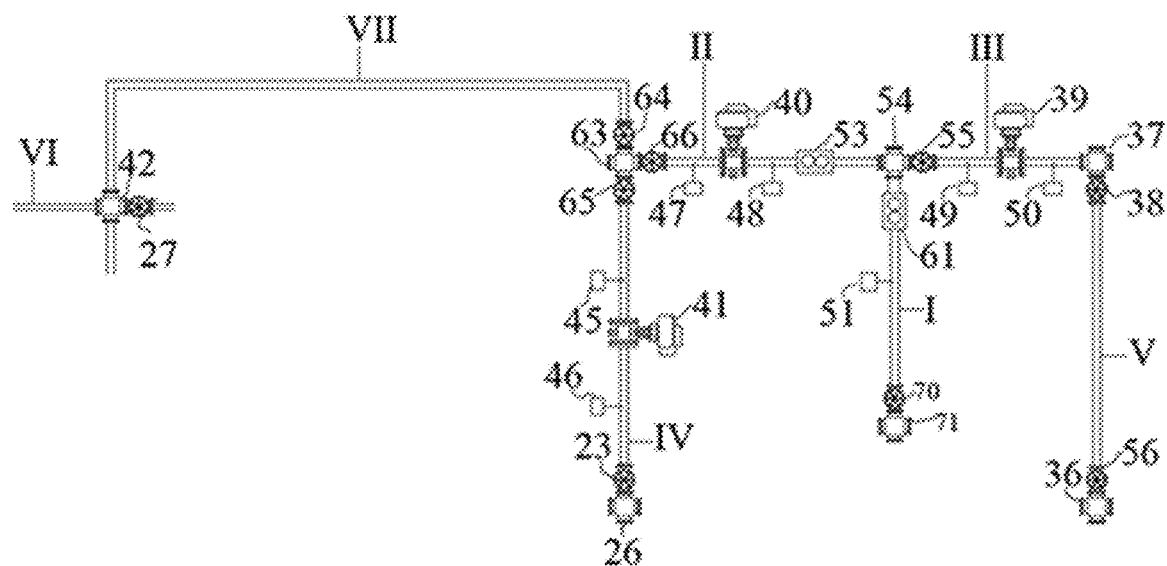
FIG. 5 is a schematic structural diagram of a back pressure diversion manifold of the present invention.

As shown in FIG. 5, the wellhead back pressure compensation manifold includes a slurry pump, an electrically controlled throttle valve, a back pressure diversion manifold, and a manual gate valve. The slurry pump is a drilling team slurry pump 10 which has no need to be equipped with a special back pressure pump, and can better meet a displacement requirement during slurry injection. The back pressure diversion manifold includes a branch $V_1$ which is connected with the slurry pump 10 through a four-way joint $SC_1$ 42, and a branch VII that connects the four-way joint $SC_1$ 42 and a tee joint $T_7$ 63; the branch VII is connected with the branch II, the branch III and the branch V of the ground simple throttle control manifold through the tee joint $T_7$ 63, and is connected with the vibrating screen 19 through the four-way joint $SC_4$ 36, or connected with the vibrating screen 19 through the four-way joint $SC_4$ 36 via the gas-liquid separator 15.

In comparison to FIG. 4 and FIG. 5, the wellhead back pressure compensation manifold and the ground simple throttle control manifold share the branch II, the branch III, the branch VI and the branch V. In practice, the wellhead back pressure compensation system is only additionally provided with the branch VI and the branch VII which connect the slurry pump 10 and the tee joint $T_7$ 63 on the ground simple throttle control manifold, thereby further simplifying the equipment configuration. The electrically controlled throttle valves and the pressure sensors included in the wellhead back pressure compensation system have been disposed on the branch II, the branch III and the branch IV on the ground simple throttle control manifold, without any additional configuration, including: the electrically controlled throttle valves $V_1$ 39, $V_2$ 40 and $V_3$ 41, and the pressure control manifold pressure sensors $P_2$ 46, $P_3$ 47, $P_4$ 47, $P_5$ 48, $P_6$ 49 and $P_7$ 50.

In a non-back-pressure compensation stage, the manual gate valve $SV_1$ 64 on the wellhead back pressure compensation manifold is closed. The back pressure compensation operation can be implemented just by opening the manual gate valve $SV_{11}$ 64 and closing the manual gate valve $SV_{28}$ 95. When a connection state of the ground simple throttle control manifold and the well control throttle manifold 16 changes, a flow path of the drilling fluid keeps unchanged, but a transmission path of the back pressure changes when the return pressure compensation operation is started.

Figure 9:
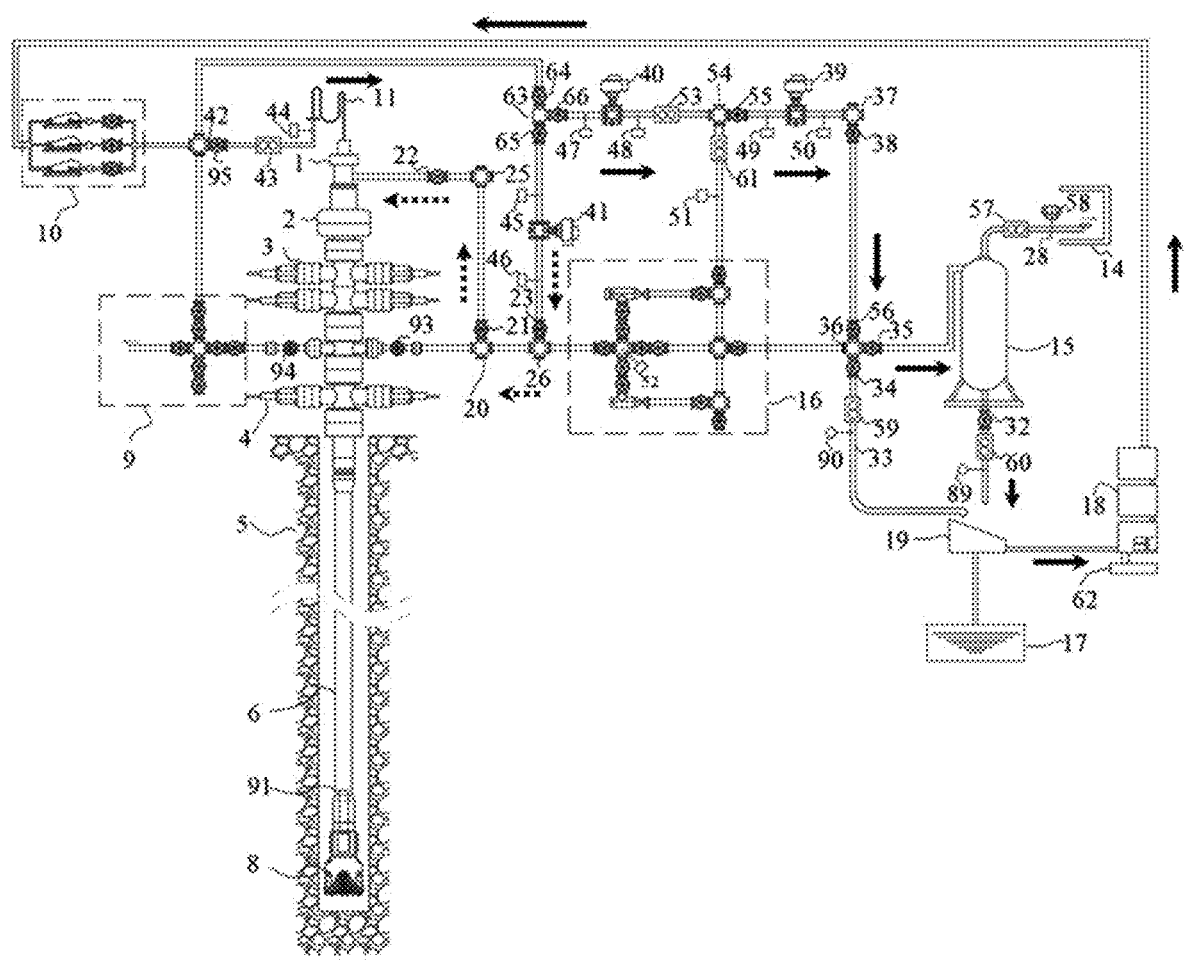
FIG. 9 is a schematic diagram of a flow path and a compensation back pressure transmission path of drilling fluid in a back pressure compensation manifold when the ground simple throttle control manifold is connected in parallel with the well control throttle manifold.
Figure 10:
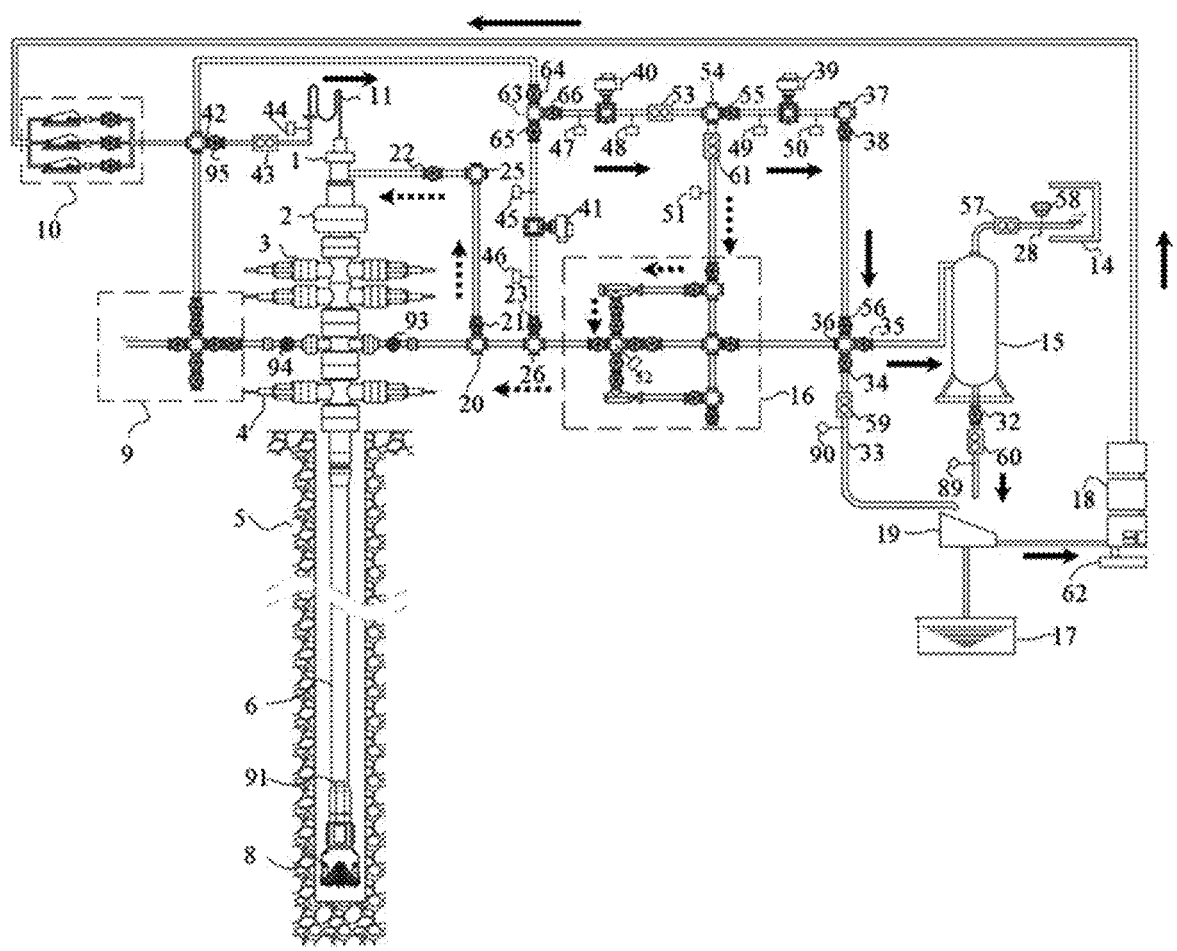
FIG. 10 is a schematic diagram of a flow path and a compensation back pressure transmission path of the drilling fluid in the back pressure compensation manifold when the ground simple throttle control manifold is connected in series with the well control throttle manifold.

As shown in FIG. 9 and FIG. 10, when the manual gate valve $SV_{11}$ 64 is opened for starting the back pressure compensation operation, a flow path of the drilling fluid is as follows: the drilling fluid enters the branch VII of the wellhead back pressure compensation manifold from the slurry pump 10 through the four-way joint $SC_1$ 42, sequentially flows through the branch II, the branch III and the branch V, and enters the gas-liquid separator 15 through the four-way $SC_4$ 36; and the separated drilling fluid flows through the vibrating screen 19, and then enters into the slurry tank 18 after solid control. As shown in FIG. 9, when the ground simple throttle control manifold is connected in parallel with the well control throttle manifold 16, the back pressure generated by the back pressure compensation manifold is applied by the rotary blowout preventer 1 to a wellbore along a pipeline sequentially through the branch IV and the tee joints $T_4$ 26, $T_1$ 20 and $T_3$ 25. As shown in FIG. 10, when the ground simple throttle control manifold is connected in series with the well control throttle manifold 16, the back pressure generated by the back pressure compensation manifold is applied by the rotary blowout preventer 1 to the wellbore sequentially through the branch I, the tee joint $T_9$ 71, the hydraulically controlled throttle valve 67, the four-way joint $SC_3$ 82, the manual gate valve $SV_{19}$ 77, and the tee joints $T_4$ 26, $T_1$ 20 and $T_3$ 25.

The back pressure of the wellhead back pressure compensation manifold is regulated by the electrically controlled throttle valves $V_1$ 39 and $V_2$ 40, the applied back pressure value is measured by a pressure sensor $P_9$ 52, and the opening degree of the electrically controlled throttle valve is automatically given by intelligent control software.

The wellhead back pressure compensation manifold of the present invention is mainly different from the prior art in that: the ground back pressure compensation device 12 of the existing fine MPD technology, which is composed of an electric three-plunger pump, an AC motor, a water supply pipeline, a water drainage pipeline, a Coriolis flowmeter, and the like, adopts a skid-mounted structure as a whole, and is difficult to meet the application requirements in scenarios with limited well site spaces, such as mountain drilling and offshore drilling due to complex equipment structures and large occupied area; in addition, the water feeding efficiency of the back pressure compensation device is not high, resulting in unstable outlet flow and difficulty to accurately control the wellhead back pressure; the frequent start and stop in field operations will also cause the failure of a frequency converter and a control system; and moreover, a motor rating of the back pressure compensation device is relatively large, such that the drilling team needs to be equipped with a 400 KW generator dedicated for power supply. The wellhead back pressure compensation manifold described in the present invention is composed of a drilling team slurry pump 10, electrically controlled throttle valves, a back pressure diversion manifold, manual gate valves, etc., wherein the back pressure diversion manifold is essentially just additionally provided with a diversion branch VI and a branch VII on the ground simple throttle control manifold, and shares the electrically controlled throttle valves and flowmeters with the ground simple throttle control manifold. The flow path of the drilling fluid is changed by opening and closing the manual gate valves, and the back pressure compensation is performed by means of the intelligent regulation of the electrically controlled throttle valves, and no skid-mounted device is needed, thereby achieving simple equipment structure, low cost and small occupied area. In addition, in the wellhead back pressure compensation manifold, the electric three-plunger pump is replaced with the drilling team slurry pump 10, without the need to be equipped with a special generator additionally, such that the problems of low displacement, low water feeding efficiency, more stable outlet flow, easy failure and the like are fundamentally solved, and the needs of slurry injection in large displacements can be met.

Figure 6:
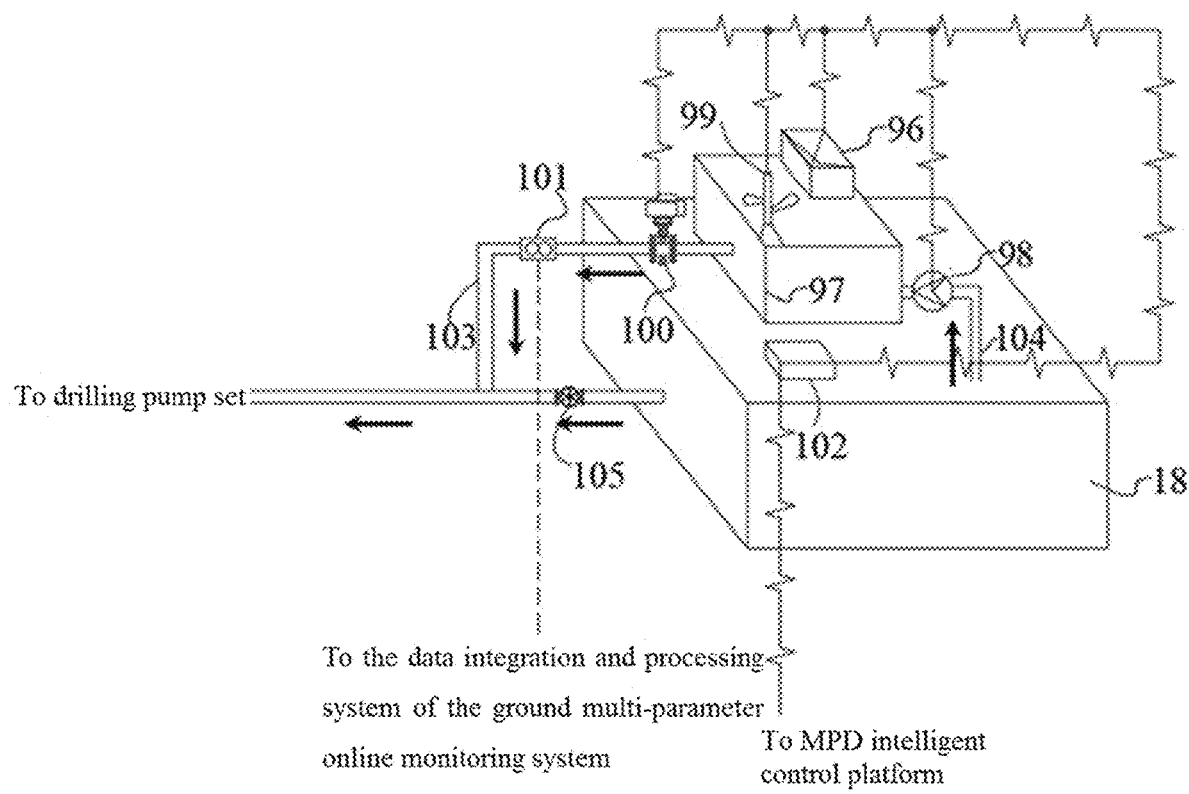
FIG. 6 is a schematic structural diagram of an automatic filling device for plugging materials in the present invention.

As shown in FIG. 6, the automatic filling device 62 for plugging materials in this embodiment includes a slurry suction pump 98, a filling tank 97, a feeder 96, a mixer 99, an electrically controlled throttle valve $V_4$ 100 on the filling tank, a feeding control system 102, a flowmeter $F_7$ 101, a slurry suction pipeline 104 and a slurry injection pipeline 103. As shown in FIG. 6, the filling tank 97 is mounted on the slurry tank 18, is connected with the slurry tank 18 through the slurry suction pipeline 104, and is connected with a water supply pipeline on the slurry pump through the slurry injection pipeline 103; the slurry suction pump 98 is mounted on the slurry suction pipeline 104; the electrically controlled throttle valve $V_4$ 100 on the filling tank and the flowmeter $F_7$ 101 are mounted on the slurry injection pipeline 103; and the mixer 99, the feeder 96 and the feeding control system 102 are mounted on the filling tank 97. The feeding control system 102 is connected with the mixer 99, the feeder 96 and the slurry suction pump 98, and is connected with the MPD intelligent control platform 87; and the MPD intelligent control platform 87 can automatically control operating parameters of opening, closing and rotational speeds, etc. of the mixer 99, the feeder 96 and the slurry suction pump 98.

The automatic filling device 62 for the plugging materials can realize the configuration and graded controllable injection of plugging slurry under the control of the MPD intelligent control platform 87, and its working principle is as follows:

if it is necessary to carry out the plugging operation, the electrically controlled throttle valve $V_4$ 100 is opened, and the slurry suction pump 98 sucks the drilling fluid in the slurry tank into the filling tank 97 through the slurry suction pipeline 104 under the control of the MPD intelligent control platform 87, and the plugging materials are added to the filling tank 97 through the feeder 96, and mixed evenly by the mixer 99. The feeder 99 can control a feeding speed of the plugging materials under the control of the MPD intelligent control platform 87, so as to ensure that the feeding uniformity of the plugging materials and the concentration of the plugging slurry in the filling tank 97 meet the requirements. The filling tank flowmeter $F_7$ 101 is used to measure a flow rate of the plugging slurry in the slurry injection pipeline, the flow rate in the injection of the plugging slurry is controlled by adjusting the opening degree of the electrically controlled throttle valve $V_4$ 100 on the filling tank, and the concentration of the plugging slurry pumped into the well is controlled by adjusting the displacement of the slurry pump.

The downhole storage-type pressure measuring device 91 is mounted in a drill collar at the upper part of a drill bit, and may be configured to measure and store downhole pressure and temperature data. The downhole storage-type pressure measuring device is mainly configured to correct a drilling hydraulic model used in the drilling hydraulic calculation system 30, and is not optional, i.e., can be determined whether to be installed according to actual situations. It is recommended to mount and test the downhole storage-type pressure measuring device in the first drilling pass of single drilling, but not mount in the subsequent passes.

The drilling hydraulic calculation system 30 is divided into two modules, i.e., a drilling fluid single-phase module and a gas-liquid two-phase module, to adapt to the requirements of different drilling flow conditions. The drilling hydraulic calculation software can meet the needs of different types of oil and gas wells such as straight wells, inclined wells, horizontal wells, and offshore drilling. The drilling hydraulic calculation software can take the changing characteristics of the density, rheology and the like of the drilling fluid over the temperature and pressure into account, and is suitable for water-based drilling fluid, oil-based drilling fluid and oil-in-water drilling fluid. The drilling hydraulic calculation software is a steady-state calculation model, which has a fast calculation speed and can complete a complete set of calculations within 2s. The drilling hydraulic calculation software is connected with the ground multi-parameter online monitoring system 86 and the MPD intelligent control platform 87, and is configured to calculate a bottom hole pressure in real time according to the monitoring data provided by the ground online monitoring system 86, and transmit the bottom hole pressure to the intelligent control system 87 in real time, thereby providing basic data for its intelligent control. Steady-state calculation and transient calculation of the software are two main calculation modules.

The steady-state calculation module has a fast calculation speed, and the time required to complete a set of calculations is less than 1 second. The steady-state calculation module is used for flow calculations for the wellbore while drilling in the drilling process.

The steady-state calculation model includes two sets of calculation models, i.e., a drilling fluid single-phase flow model and a gas-liquid two-phase flow model. A Herschel-Bulckley model is used to calculate the drilling fluid single-phase flow. This model is suitable for both Bingham fluid and power-law fluid, and is also applicable to most types of drilling fluids. A Gucuyener model is used to calculate a nozzle pressure drop. The Herschel-Bulckley model has been demonstrated to have higher computational accuracy for flow calculations in deep and complex wells. In order to further improve the accuracy of steady-state hydraulic calculation, the dynamic changes in the density and rheology of the drilling fluid under a quasi-steady-state temperature field as well as high temperature and pressure are considered in the model. A Hasan-Kabir model is used for the quasi-steady-state temperature field, a Karstad-Aadnoy model is used for the drilling fluid density prediction at different temperatures and pressures, a Fisk-Jamision model is used for the drilling fluid flow prediction, and empirical coefficients in a drilling fluid density and rheological parameter prediction model are acquired by relevant experiments. A Petalas-Aziz mechanism model is used for gas-liquid two-phase flow calculation, and a Guo-Ghalambor model is adopted as a rock chip transport model.

The transient calculation model includes two sets of calculation models, i.e., a drilling fluid single-phase flow model and a gas-liquid two-phase flow model. The transient calculation only takes the gas production of a formation into an account, with the drilling fluid single-phase flow in a drill string and the gas-liquid two-phase flow in an annulus. The drilling fluid flow model in the drill string includes a one-dimensional continuity equation and a momentum equation of a liquid phase, wherein the flow model is calculated by using a Herschel-Bulckley model and iteratively solved by using a finite difference method. The gas-liquid two-phase fluid flow in the annulus is calculated by using a drift model, and solved by using a finite volume method, and the specific solution format adopts an AUSM+ format.

The steady-state calculation includes two calculation modules, wherein a calculation path of the calculation module I is as follows: taking flow parameters at an annulus outlet as an initial condition for calculation, the calculation starts from the annulus outlet to the well bottom along the annulus, through the drill bit, and iteratively up to a riser from the well bottom through a flow space inside the drill string. A calculation path of the calculation module II is as follows: taking flow parameters at an inlet as an initial condition for calculation, the calculation starts from a drill string inlet to the well bottom along a flow channel inside the drill string, through the drill bit, and iteratively up to the annulus outlet from the well bottom through the flow space of the annulus. If there is no gas production, the annulus and the drill string are both filled with the drilling fluid single-phase fluid, and a Herschel-Bulckley model is adopted for flow calculation. The data obtained by the module calculation I include: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity and rock chip concentration on the annulus path throughout the entire calculation path. If there is gas production, the drill string is filled with the drilling fluid single-phase fluid, and a Herschel-Bulckley model is used for flow calculation; and the annulus is filled with the gas-liquid two-phase fluid and Petalas-Aziz is used for flow calculation. The data obtained by the module calculation I includes: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity, rock chip concentration, gas-phase speed, gas-phase volume fraction and gas-phase density, and gas-liquid two-phase mixed density on the annulus path throughout the entire calculation path. All calculation data is stored in a database in real time and can be invoked at any time.

A calculation path of the transient calculation is as follows: taking flow parameters of the drilling fluid at the inlet as an initial condition for calculation, the calculation starts from the drill string inlet to the well bottom along a flow channel inside the drill string, through the drill bit, and iteratively up to the annulus outlet from the well bottom through the flow space of the annulus. The transient calculation only takes gas production conditions into account, wherein the drill string is filled with the drilling fluid single-phase fluid, and a Herschel-Bulckley model is used for flow calculation; and the annulus is filled with the gas-liquid two-phase fluid and Petalas-Aziz is used for flow calculation. The data obtained by the module calculation I include: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity, rock chip concentration, gas-phase speed, gas-phase volume fraction, gas-phase density, gas-phase drift velocity, liquid phase mass flow, and gas phase mass flow on the annulus path throughout the entire calculation path at each time node.

The drilling hydraulic calculation system 30 performs real-time calculation along the calculation path II by using the steady-state calculation module during the MPD operation. All the calculated data is stored in a database and can be invoked at any time. The bottom hole pressure is transmitted to the ground online monitoring system in real time, is presented on monitoring software in real time, and is used as an important basis for wellbore pressure control. The parameters required for calculation are derived from the ground online monitoring system, are automatically input into hydraulic calculation software in real time and are calculated in real time to obtain the bottom hole pressure. The required real-time data includes: drilling fluid inlet density, drilling fluid inlet temperature, drilling fluid rheological parameters, displacement, riser pressure, tool pressure drop (kill-job generated by additional tools added to the drill string, such as tools for monitoring while drilling (MWD), rotary guide and acceleration in addition to the drill string and the drill collar, and the data is measured before entering the well), sounding depth and vertical depth. The remaining data (including a wellbore structure, a well trajectory, a drilling tool assembly, diameters and number of drill bit nozzles, and nozzle pressure drop) are pre-inputted into software before MPD drilling.

The calculation path I of the steady-state calculation module of the drilling hydraulic calculation system 30 is mainly used to correct and verify a model. Prior to the MPD operation, the calculation path I is selected by using adjacent well data or data of a drilled section of an operating well, and the calculated riser pressure is compared with a measured riser pressure, and then the model is verified and corrected. In the MPD operation, the calculation path I can also be artificially selected to perform on-site model correction according to the data of several drilled well sections of the operating well and time data. Further, the model can also be verified and corrected according to classical data from ground simulation experiments or literature reports.

The transient calculation module of the drilling hydraulic calculation system 30 is mainly used to simulate a gas-liquid two-phase flow state and a pressure evolution law of the annulus after gas cutting, so as to provide a basis for the control of the wellbore pressure. The transient flow calculation module is generally operated by expert technicians prior to MPD to perform a series of simulation calculations in order to develop a corresponding pressure control chart. Furthermore, the transient flow calculation module can also be initiated for model analysis at any time according to the needs of the technicians during the MPD operation.

The settings of the drilling hydraulic calculation system 30 are composed of a calculation module selection, a calculation path selection, a parameter input, a monitoring-while-drilling data interface, a calculation data output port, a calculation data display area, a data display option and a setting box, and a database. The monitoring-while-drilling data interface is connected with the data integration software of the ground online monitoring system, and the calculation data output port is connected with the monitoring software of the ground online monitoring system and the MPD intelligent control terminal.

The steady-state calculation module, the transient calculation module, the calculation path I and the calculation path II of the drilling hydraulic calculation system 30 are of independent operations and independent storage, without any interference with each other, and can operate at the same time.

Figure 11:
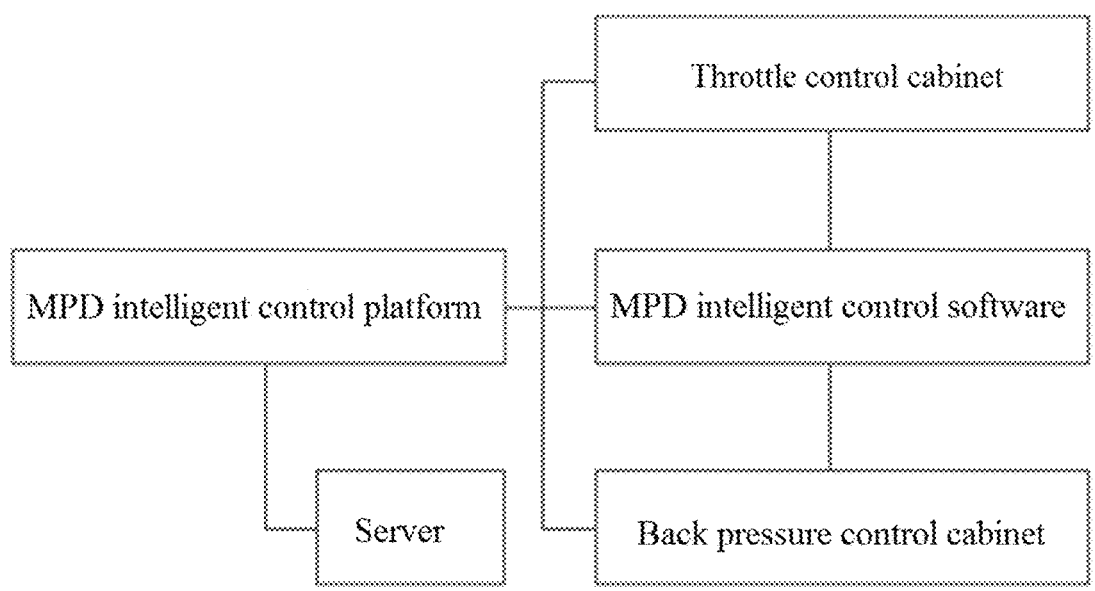
FIG. 11 is a composition diagram of an MPD intelligent control system of the present invention.

As shown in FIG. 11, the MPD intelligent control platform 87 includes an MPD intelligent control terminal, a throttle control cabinet, a back pressure compensation control cabinet, and a server, and thus serves as a master control center of the MPD system.

The MPD intelligent control terminal is connected with the throttle control cabinet, and is connected with the ground simple throttle control system through the throttle control cabinet, thereby controlling the opening degree of the throttle control system, and an applied wellhead casing pressure. The throttle control cabinet is connected with the electrically controlled throttle valves $V_1$ 98, $V_2$ 40 and $V_3$ 41 and the hydraulically controlled throttle valve, and instructions for mounting the MPD intelligent control terminal are used to control the opening degrees of the respective electrically controlled throttle valves and the hydraulically controlled throttle valve.

Further, the MPD intelligent control terminal is connected with the back pressure compensation control cabinet, and is connected with the wellhead back pressure compensation manifold through the back pressure compensation control cabinet, thereby controlling the opening and closing of the back pressure compensation manifold and an applied wellhead back pressure. The back pressure compensation control cabinet is connected with the electrically controlled throttle valves $V_1$ 98 and $V_2$ 40, and instructions for mounting the MPD intelligent control terminal are used to control the opening degrees of the respective electrically controlled throttle valves.

The MPD intelligent control terminal is also connected with the ground multi-parameter online monitoring system 86 and the drilling hydraulic calculation system 30, and reasonable control instructions can be obtained in real time through a machine learning intelligent algorithm according to basic data collected by the MPD intelligent control terminal, and automatically transmitted to an actuator.

The MPD intelligent control terminal includes an intelligent control module and an artificial control module, which are independent of each other, do not interfere with each other, and can be artificially selected.

The intelligent control module forms a plurality of pressure control instruction samples under a plurality of MPD conditions by collecting and sorting out basic data of different operation modes in the multi-well MPD construction process in advance, the plurality of pressure control instruction samples corresponding to control constructions artificially given under different working conditions. Each sample contains a basic data vector array and a control instruction array in the construction process, and a plurality of samples forms a sample library which is stored in a database. In the construction process, the basic data of MPD is collected first to form a real-time data vector array, and the real-time data vector array and the basic data vector array of the respective samples in the sample library are calculated for vector distances, the calculation methods including but not limited to an Euclidean distance, a Chebyshev distance and other methods. A sample having the minimum value from the real-time data vector distance calculation is selected as a decision output sample, and the control instruction array in this sample is outputted to a pressure compensation device to intelligently adjust a drilling pressure.

Further, the MPD intelligent control platform is also connected with the remote monitoring and control system.

As shown in FIG. 11, the remote monitoring and control system 88 includes a remote monitoring center, a data center, an expert workstation, a control center, and a server.

The remote monitoring center is connected with the MPD intelligent control platform through communication network equipment. The data center is configured to store all monitored data and all the data when the drilling has been performed, and to train an intelligent machine learning algorithm of the MPD intelligent control terminal. The expert workstation is equipped with a variety of engineering calculation and analysis software, accompanied by telecommuting of experts; and expert opinions and instructions can be directly transmitted to the MPD intelligent control terminal through the control center.

The remote intelligent active drilling pressure control system may also include a rotary blowout preventer 1 to achieve a more complete pressure control function, and may also include some other equipment, such as a derrick, a kill manifold, etc., to achieve various functions of drilling.

Embodiment 2

An embodiment of the present invention provides a remote intelligent active drilling pressure control method. The remote intelligent active drilling pressure control method is implemented by using the remote intelligent active drilling pressure control system. The method includes the following steps S1 to S4:

In S1, drilling parameters and engineering technical data are pre-inputted to the MPD intelligent control terminal prior to drilling.

The drilling parameters include a well category, a well type, a well depth, a well body structure, a well trajectory, a displacement, a drilling pressure, a rotational speed, formation lithology, drilling fluid density and viscosity, reservoir parameters and the like, and the pre-inputted data is derived from a drilling engineering design. The engineering calculation data includes formation's three-pressure profiles (pore pressure, collapse pressure, leakage loss pressure), fracture parameters (development degree, fracture density, fracture width, etc.), plugging parameters and the like, and the pre-inputted data is derived from, but not limited to the drilling engineering design and/or engineering calculation and analysis software (Petrel, Landmark, etc.).

Further, the drilling hydraulic calculation system 30 is pre-verified and model-corrected prior to drilling. The basic data used is derived from historical data stored in the data center of the remote monitoring and control system 88. It is necessary for software verification and model correction to select drilling foundation data of the same, or adjacent or similar blocks, and preferably select downhole measured data. The downhole measured data is derived from a storage-type pressure measuring device 91, or from PWD 7. The basic data may also be derived from, but not limited to indoor experimental data, field test data, etc.

In S2, modes of MPD construction operation, ground multi-parameter real-time monitoring, and intelligent identification operation are entered.

The pressure control of drilling can be divided into a pressure control mode and a non-pressure-control mode. The pressure control method described in the present invention is only applicable to the pressure control mode. The switching between the pressure control mode and the non-pressure-control mode is switched by opening and closing manual gate valves $SV_1$ 21, $SV_2$ 22, $SV_3$ 23, $SV_6$ 34, $SV_7$ 35, $SV_{10}$ 56, $SV_{11}$ 64, $SV_{15}$ 70, $SV_{16}$ 72, and $SV_{26}$ 93. The non-pressure-control mode is entered by closing the manual gate valves $SV_1$ 21, $SV_2$ 22, $SV_3$ 23, $SV_7$ 35, $SV_{10}$ 56, $SV_{11}$ 64, and $SV_{15}$ 70, and opening the manual gate valves $SV_6$ 34, $SV_{16}$ 72, and $SV_{26}$ 93. The manual gate valves $SV_5$ 32, $SV_8$ 38, $SV_9$ 55, $SV_{12}$ 65, $SV_{13}$ 66, $SV_{14}$ 69, $SV_{19}$ 77, $SV_{20}$ 78, $SV_{21}$ 79 and $SV_{28}$ 95 are in a normally opened state, and the manual throttle valves $SV_{17}$ 75, $SV_{18}$ 76, $SV_{22}$ 80, $SV_{23}$ 81, $SV_{24}$ 83, $SV_{25}$ 84 and $SV_{27}$ 94 are also in a normally closed state. In the non-pressure-control mode, the drilling fluid returns from a four-way wellhead, enters the well control throttle manifold 16 sequentially through the manual gate valve $SV_{26}$ 93 and $SV_{19}$ 77, flows through the vibrating screen 19 through the manual gate valve $SV_{16}$ 72, the four-way joint $SC_4$ 36 and the manual gate valve $SV_6$ 34, and then returns to the slurry tank 18. The pressure control mode can be entered by opening the manual gate valves $SV_1$ 21, $SV_2$ 22, $SV_3$ 23, $SV_7$ 35, $SV_{15}$ 70 and $SV_{10}$ 56 and closing the manual gate valves $SV_6$ 34, $SV_{11}$ 64, $SV_{16}$ 72 and $SV_{26}$ 93.

In the pressure control mode, the electrically controlled throttle valve $V_1$ 39 on the branch III of the ground simple throttle control manifold and the hydraulically controlled throttle valve 67 on the well control manifold are opened, the electrically controlled throttle valve $V_2$ 40 on the branch II and the electrically controlled throttle valve $V_3$ 41 on the branch IV are closed, and the ground simple throttle control manifold is connected in series with the well control throttle manifold 16. The circulating drilling fluid returns from a side outlet of the rotary blowout preventer 1, enters the ground simple throttle control manifold through the well control manifold 16, then sequentially flows through the branch I, the branch III and the branch V, enters the drilling team gas-liquid separator 15 through the four-way $SC_4$ 36 and the manual gate valve $SV_7$ 35, flows through the vibrating screen 19 and then returns to the slurry tank 18.

Further, in the pressure control mode, the ground simple throttle control manifold may also be connected in parallel with the well control throttle manifold 16, and the execution operations include: opening the electrically controlled throttle valves $V_1$ 39, $V_2$ 40, and $V_3$ 41 on the branch II, the branch III and the branch IV of the ground simple throttle control manifold, and closing the hydraulically controlled throttle valve 67. The circulating drilling fluid returns from the side outlet of the rotary blowout preventer 1, sequentially flows through the branch IV, the branch II, the branch III and the branch V of the ground throttle control manifold, enters the drilling team gas-liquid separator 15 sequentially through the four-way $SC_4$ 36 and the manual gate valve $SV_7$ 35, flows through the vibrating screen 19 and then returns to the slurry tank 18.

The two connection modes of the ground simple throttle control manifold can be switched to each other. The conversion process can be achieved just by regulating the electrically controlled throttle valves and the manual gate valves on the branches of the respective manifolds to be opened and closed, without the need to change the specific connection of the manifolds. The opening and closing of the electrically controlled throttle valves and the hydraulically controlled throttle valve 67 are controlled by the MPD intelligent control platform 87.

After entering the MPD construction operation, the ground multi-parameter online monitoring system 86 starts to collect monitoring data in real time. The turn-on and turn-off of the ground multi-parameter online monitoring system 86 can be performed individually or controlled by the MPD intelligent control platform 87. The data monitored by the ground multi-parameter online monitoring system 86 is automatically inputted into the drilling hydraulic calculation system 30 in real time, and the bottom hole pressure is calculated in real time. The calculation results are transmitted in real time to the MPD intelligent control platform 87 and the remote monitoring and control system 88 for real-time identification and intelligent control of the wellbore pressure. The turn-on and turn-off of the high-precision drilling hydraulic calculation system 105 are kept in consistency with the ground multi-parameter online monitoring system; and once the ground online monitoring system is turned on, the drilling hydraulic calculation system 30 is triggered to be turned on to perform real-time calculation. The drilling hydraulic calculation system 30 may also be turned on separately under the control of the MPD intelligent control platform 87.

Further, the drilling operation modes are divided into a normal drilling mode, a connection-making mode, a tripping-and-drilling mode and complex working modes. The complex working modes may also include a well leakage mode, and an overflow and well-kicking mode. Different operation modes are intelligently identified by the MPD intelligent control terminal based on the monitoring data of well depth, hook load, drilling pressure, rotational speed, vertical pressure, casing pressure, drilling fluid inlet/outlet density and flow, and gas measurement values of the ground multi-parameter online monitoring system, and supplemented by manual confirmation options.

In S3, a plugging operation while drilling is carried out to expand a "drilling safety density window" of a formation.

Prior to drilling into a leak-prone formation, an anti-leakage plugging agent while drilling is added into the pumped drilling fluid to enhance the pressure bearing capacity of the formation, increase a leakage loss pressure of the formation, prevent the well leakage, and expand the "drilling safety density window" of the formation. The selection and ratio of the leak-proof plugging agent while drilling need to be determined according to a leakage loss type of the leak-prone formation and corresponding fracture parameters (development degree, fracture density, fracture width, etc.). The determination of the relevant parameters can be calculated by engineering calculation and analysis software installed on the expert workstation of the remote monitoring and control system 88. There are many types of anti-leakage plugging agents, and a formula of each anti-leakage plugging agent includes a variety of materials and the ratio of each material, which may vary in different oil fields and blocks. The selection and ratio of the anti-leakage plugging agent of the present invention is inputted into the system prior to specific drilling, and are specifically derived from the drilling design, related research reports, etc.

Further, the selection and ratio of the anti-leakage plugging agent while drilling can also be intelligently determined by the MPD intelligent control platform 87. The MPD intelligent control platform 87 intelligently and automatically retrieves construction data of similar formation drilling in the data center of the remote monitoring and control system, performs automatic match and identification, and gives recommended formulas and ratios.

Further, the multi-slug graded plugging operation in the case of well leakage is performed to effectively plug the formation so as to form a dense and high-strength plugging zone, thereby improving the leakage loss pressure of the formation and expanding the "drilling safety density window" of the formation.

The multi-slug graded plugging operation includes: grading plugging slurry according to the characteristics of formation fractures and particle sizes of plugging materials, and then injecting the plugging slurry into a wellbore in batches, so that the plugging materials enter the formation fractures in a graded and orderly manner to form a dense and effective plugging layer. In the multi-slug graded plugging operation, the large-particle plugging material injected first forms a bridge at a throat position of the fracture, the second-grade plugging material is sequentially injected for filling, and the third-grade plugging material injected last is supplemented to form a dense plugging layer.

Different from a conventional bridge plug plugging technology, different particle sizes and different types of plugging materials are mixed according to certain ratios and concentrations, and injected into the formation fractures together to form a plugging layer in the fractures. The multi-slug graded plugging process can make the plugging materials accumulated more orderly to form a denser plugging layer, thereby improving a plugging effect.

In the multi-slug graded plugging operation, a graded filling device 62 is required for the graded filling of the plugging materials. After the formation has a leakage loss, the MPD intelligent control platform 87 automatically identifies a well leakage condition in real time by using the data collected by the ground multi-parameter online monitoring system 86; and the MPD intelligent control terminal will send instructions to the graded filling device 62 in real time to perform the plugging operation according to preset plugging parameters prior to drilling.

In the multi-slug graded plugging operation, the plugging materials can be artificially filled in a graded manner.

Further, the MPD intelligent control terminal can also be configured to analyze parameters such as the widths of the fractures in the formation according to the leakage loss situation on site, intelligently give plugging parameters, and send the instructions to the graded plugging device 62 to perform the plugging operation. The relevant analysis is performed by the MPD intelligent control terminal to automatically invoke the engineering analysis software installed by the expert workstation of the remote monitoring and control system 88 according to on-site leakage loss data.

The specific construction process of the multi-slug graded grading plugging operation described in the present embodiment is as follows.

the MPD intelligent control system 87 controls a suction pump 98 to be turned on to pump the drilling fluid in the slurry tank 18 of a set volume into the filling tank 96, and grades plugging slurry according to selected leakage plugging formulas, wherein the first-grade large-grained elastic and rigid mixed materials are added first and mixed well; and the concentration of the plugging slurry in the filling tank 96 is automatically calculated according to the amount of the drilling fluid in the filling tank 96 and the addition amounts of the plugging materials. A set volume accounts for one-half to two-thirds of the volume of the filling tank.

After the plugging slurry in the filling tank 96 is prepared well, the slurry pump is turned on, and the displacement of the pump is given by the MPD intelligent control platform 87. The displacement should not be too large, and needs to be controlled at 7 to 10 L/s for easy operation and precise control.

The MPD intelligent control platform 87 controls the opening degree of an electrically controlled throttle valve $V_4$ 99 on the filling tank, and adjusts an injection flow rate of the first-grade plugging slurry to control the concentration of the plugging slurry injected into the wellbore.

After the pumping of the first-grade plugging slurry is completed, the slurry pump is turned off, and the operations of the above steps are repeated to complete the filling and pumping of the second- and third-grade plugging materials in sequence.

After all grades of plugging slurry are pumped, the electrically controlled throttle valve $V_4$ 99 on the filling tank is closed, and the drilling fluid is continuously pumped to replace the slurry.

The formulas of the plugging slurry at all grades in the above operations need to be stored in the MPD intelligent control system 87 in advance, and will be automatically screened according to the monitored leakage loss, etc.

Further, the formula of the plugging slurry selected in the above operation can also be artificially screened by the field engineers.

The expansion of the "drilling safety density window" of the formation in the plugging operation while drilling is a conventional measure in the present invention, and is not carried out only when a serious well leakage occurs.

Figure 12:
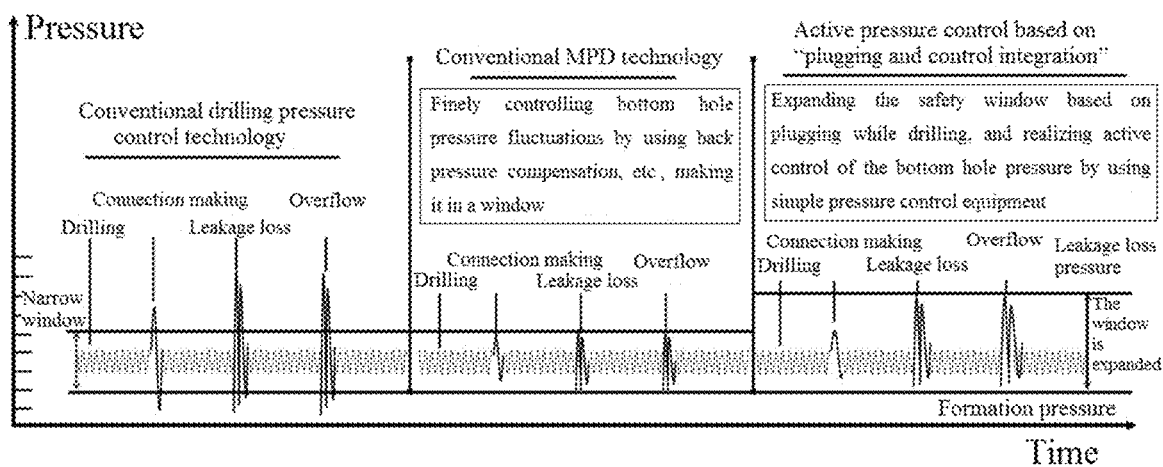
FIG. 12 is a schematic diagram of the comparison of working principles of wellbore pressure control performed by using the present invention and a conventional pressure control technology and a fine MPD technology.

As shown in FIG. 12, compared with the fine MPD technology in which a bottom hole pressure is finely controlled by complex ground pressure control equipment passively according to the "drilling safety density window" of the formation to be in the "safety density window", the present invention proposes that the plugging operation is carried out while drilling through real-time monitoring of leakage loss and other data, such that the formation is actively changed to enhance the pressure bearing capacity of the formation, expand the "safety density window" of the formation, and objectively reduce the accuracy requirements of wellbore pressure control on ground wellbore pressure control equipment, thereby achieving the purpose of controlling the wellbore pressure with relatively simple equipment, without the needs for the automatic throttle manifold 16, the back pressure compensation device 27 and other equipment with high control accuracy, effectively reducing the equipment occupancy space and reducing the operation cost.

The step S3 is non-required, and thus this operation may be selected not to be carried out under normal drilling conditions such as no leakage loss, no well kicking and no overflow.

In S4, wellbore pressures are intelligently regulated under different operation modes.

The drilling operation modes are divided into a normal drilling mode, a connection-making mode, a tripping-and-drilling mode and complex working modes. The complex working modes may also include a well leakage mode, and an overflow and well-kicking mode. According to different drilling operation modes, the MPD intelligent control platform 87 intelligently controls the ground simple throttle control manifold, the back pressure compensation manifold, the slurry pump 10 and other equipment according to the real-time data monitored by the ground multi-parameter online monitoring system 86, and then automatically controls the wellbore pressure.

In the case that the ground simple throttle control manifold is connected in parallel with the well control throttle manifold, a wellbore pressure control method under different drilling operation modes is as follows.

In the normal drilling mode, the MPD intelligent control platform 87 controls the electrically controlled throttle valve $V_1$ 39, the electrically controlled throttle valve $V_2$ 40, and the electrically controlled throttle valve $V_3$ 41 to be opened. The circulating drilling fluid returns from the side outlet of the rotary blowout preventer 1, sequentially flows through the branch IV, the branch II, the branch III and the branch V of the ground throttle control manifold, enters the drilling team gas-liquid separator 15 sequentially through the four-way $SC_4$ 36 and the manual gate valve $SV_7$ 35, flows through the vibrating screen 19 and then returns to the slurry tank 18. The MPD intelligent control platform 87 controls the electrically controlled throttle valve $V_2$ 40 and the electrically controlled throttle valve $V_3$ 41 to be fully opened, and the opening degree of the electrically controlled throttle valve $V_1$ 39 is regulated by taking a preset pressure control value given by the MPD intelligent control platform 87 as a benchmark to maintain the MPD. If a throttle pressure drop of the electrically controlled throttle valve $V_1$ 39 is close to its rated value and still does not reach the preset pressure control value, the opening degrees of the electrically controlled throttle valve $V_2$ 40 and the electrically controlled throttle valve $V_3$ 41 are sequentially regulated to implement multi-stage throttling. The throttle pressure drop of the electrically controlled throttle valve is measured by two pressure sensors mounted on either side of this electrically controlled throttle valve. The preset pressure control value, that is, a casing pressure value, is measured by a pressure control manifold pressure sensor $P_6$ 49. Further, it is also possible to simultaneously regulate the opening degrees of the electrically controlled throttle valves $V_1$ 39, $V_2$ 40 and $V_3$ 41 from the beginning of the pressure control to implement multi-stage throttle control.

In the connection-making mode, a manual gate valve $SV_{28}$ 95 on a drilling fluid injection pipeline and a flow channel of the drilling fluid to a water hose are closed, the manual gate valve $SV_{11}$ 64 and a flow channel to the back pressure compensation manifold are opened, the MPD intelligent control platform controls the electrically controlled throttle valve $V_3$ 41 to be fully opened, and the opening and closing states of other valves are kept in consistency with those in the normal drilling mode. The circulating drilling fluid enters the back pressure compensation manifold through the four-way joint $SC_1$ 42, sequentially flows through the branch I, the branch II, the branch II, the branch IV and the branch V of the back pressure diversion manifold, enters the drilling team gas-liquid separator 15 sequentially through the four-way $SC_4$ 36 and the manual gate valve $SV_7$ 35, flows through the vibrating screen 19 and then returns to the slurry tank 18. The MPD intelligent control platform 87 regulates the opening degree of the electrically controlled throttle valve $V_1$ 39 by taking a preset back pressure value as the benchmark so as to achieve throttling and apply a back pressure, and can also regulate the opening degrees of the electrically controlled throttle valves $V_2$ 40 and $V_3$ 41 at the same time. The preset back pressure value is equal to a circulating pressure loss of the annulus, and is calculated by the drilling hydraulic calculation system 30. The back pressure value is measured by the pressure sensor $P_3$ 46. After the connection-making operation, the manual gate valve $SV_{11}$ 64 is closed, and the manual gate valve $SV_{28}$ 95 is opened to restore normal drilling.

In the tripping-and-drilling mode, the MPD intelligent control platform controls the slurry pump 10 to be turned off, and the ground multi-parameter online monitoring system 86 is always turned on to monitor the fluid level of the drilling fluid in the annulus in real time. If there is an abnormality in the fluid level, the MPD intelligent control platform 87 automatically controls the slurry pump to be turned on, and performs corresponding operations according to the abnormal fluid level; and the fluid level height of the annulus is always maintained to ensure that the bottom hole pressure is constant.

In the well leakage mode and the overflow and well-kicking mode, the opening and closing of the respective electrically controlled throttle valves and gate valves are consistent with those in the normal drilling mode, and the flow channel of the drilling fluid is also kept in consistency with that in the normal drilling mode.

In the well leakage mode, the MPD intelligent control platform 87 automatically controls and regulates the opening degree of the electrically controlled throttle valve $V_1$ 39, sequentially reduces wellhead pressure control values, and monitors the leakage loss in real time. If the electrically controlled throttle valve $V_1$ 39 has been fully opened, the wellhead pressure control value has dropped to zero. If there is still a well leakage, the MPD intelligent control platform 87 intelligently regulates the displacement and other parameters of the drilling fluid, and intelligently judges and performs the corresponding operations until the well leakage no longer occurs. If there is still a well leakage when the displacement has been reduced to a minimum displacement required for wellbore purification, etc., the intelligent control system 87 gives recommendations to reduce the drilling fluid density and carry out the plugging operation. The minimum displacement to meet the wellbore purification is calculated by the drilling hydraulic calculation system 30. Once the well leakage is found, the MPD intelligent control platform 87 automatically gives main plugging parameters and schemes; and upon artificial confirmation, the automatic filling device 62 for plugging materials is controlled to configure the plugging slurry, and the slurry pump is intelligently controlled to be turned on and off in real time to carry out the multi-slug graded plugging operation.

If the slurry injection operation is required due to the leakage loss without any slurry return, the MPD intelligent control platform 87 controls the slurry pump 10 to be turned off and the manual gate valve $SV_{28}$ 95 to be closed, and the manual gate valve $SV_1$ 64 to be opened; the slurry pump 10 is then turned on; the opening degrees of the electrically controlled throttle valve $V_1$ 39 and the electrically controlled throttle valve $V_3$ 41 on the back pressure compensation device are regulated to carry out the throttled slurry injection; the ground multi-parameter online monitoring system 86 monitors the level of the drilling fluid in the wellbore in real time; when the slurry injection amount meets the requirements, the slurry pump is turned off, the manual gate valve $SV_{11}$ 64 is closed, the manual gate valve $SV_{28}$ (95) is opened, and the flow channel of the drilling fluid restores to the normal drilling mode.

In the overflow and well-kicking mode, the MPD intelligent control platform automatically controls the opening degrees of the electrically controlled throttle valve $V_1$ 39, the electrically controlled throttle valve $V_2$ 40 and the electrically controlled throttle valve $V_3$ 41 to be reduced, and the wellhead back pressure values are increased in sequence; the bottom hole pressure is controlled; and overflow and well-kicking conditions are monitored in real time until the overflow or well kicking disappears to restore to the normal drilling state. During throttled pressure control, the single-grade throttle control can be performed just by regulating the opening degree of the electrically controlled throttle valve $V_1$ 39, or the multi-graded throttle control is performed by regulating the opening degrees of the electrically controlled throttle valve $V_1$ 39, the electrically controlled throttle valve $V_2$ 40, and the electrically controlled throttle valve $V_3$ 41 at the same time. If the wellhead back pressure has risen to rated pressures of the ground simple throttle control manifold and the hydraulically controlled throttle valve 67, or exceeded a maximum wellhead pressure specified in the relevant standards for MPD, the intelligent control system 87 automatically controls the electrically controlled throttle valve $V_1$ 39, the electrically controlled throttle valve $V_2$ 40, and the electrically controlled throttle valve $V_3$ 41 to be closed, and gives recommendations for ending the MPD and switching to the conventional well control process; and the on-site engineers decide the next step.

Further, in the overflow and well-kicking mode, the MPD intelligent control platform 87 automatically gives recommended values of drilling fluid displacement and density after eliminating overflow or gas cutting and restoring the normal drilling mode by controlling the wellhead back pressure, and the recommended values are confirmed by the field engineers.

Further, in the overflow and well-kicking mode, the MPD intelligent control platform 87 intelligently determines whether the well needs to be killed according to specific construction situations, and gives a preferred well-killing scheme and a key well-killing parameter design, which are then confirmed by the on-site engineers.

Further, in the case that the ground simple throttle control manifold is connected in series with the well control throttle manifold, a wellbore pressure control method under different drilling operation modes is as follows.

In the normal drilling mode, the MPD intelligent control platform 87 controls the electrically controlled throttle valve $V_2$ 40 and the electrically controlled throttle valve $V_3$ 41 to be closed. The drilling fluid returns from the side outlet of the rotary blowout preventer 1, enters the well control throttle manifold 16 sequentially through the tee joint $T_3$ 25 and the tee joint $T_4$ 26, enters the branch I of the ground simple throttle control manifold through the hydraulically controlled throttle valve 67 of the well control throttle manifold 16 and the tee joint $T_8$ 71, sequentially flows through the branch III and the branch V, and enters the gas-liquid separator 15 through the four-way joint $SC_4$ 36; and the separated drilling fluid flows through the vibrating screen 19, and then enters into the slurry tank 18 after solid control. The MPD intelligent control platform 87 regulates the opening degree of the electrically controlled throttle valve $V_1$ 39 by taking a preset pressure control value given by the MPD intelligent control platform 87 as a benchmark to maintain the MPD. If a throttle pressure drop of the electrically controlled throttle valve $V_1$ 39 is close to its rated value and still does not reach the preset pressure control value, the opening degree of the hydraulically controlled throttle valve 67 is regulated at the same time to implement multi-stage throttling. The throttle pressure drop of the electrically controlled throttle valve is measured by two pressure sensors mounted on either side of this electrically controlled throttle valve. The preset pressure control value, that is, a casing pressure value, is measured by a casing pressure sensor $P_9$ 52. Further, it is also possible to simultaneously regulate the opening degrees of the electrically controlled throttle valves $V_1$ 39 and the hydraulically controlled throttle valve 67 from the beginning of the pressure control to implement multi-stage throttle pressure control.

In the connection-making mode, a manual gate valve $SV_{28}$ 95 on a drilling fluid injection pipeline and a flow channel of the drilling fluid to a water hose are closed, the manual gate valve $SV_{11}$ 64 and a flow channel to the back pressure compensation manifold are opened, the MPD intelligent control platform controls the electrically controlled throttle valve $V_2$ 40 to be fully opened, and the opening and closing states of other valves are kept in consistency with those in the normal drilling mode. The circulating drilling fluid enters the back pressure compensation manifold through the four-way joint $SC_1$ 42, sequentially flows through the branch I, the branch II, the branch III, the branch IV and the branch V of the back pressure diversion manifold, enters the drilling team gas-liquid separator 15 sequentially through the four-way $SC_4$ 36 and the manual gate valve $SV_7$ 35, flows through the vibrating screen 19 and then returns to the slurry tank 18. The MPD intelligent control platform 87 regulates the opening degree of the electrically controlled throttle valve $V_1$ 39 by taking a preset back pressure value as the benchmark so as to achieve throttling and apply a back pressure, and can also regulate the opening degrees of the electrically controlled throttle valves $V_2$ 40 and $V_1$ 39 and the hydraulically controlled throttle valve 67 at the same time. The preset back pressure value is equal to a circulating pressure loss of the annulus, and is calculated by the drilling hydraulic calculation system 30. The back pressure value is measured by the casing pressure sensor $P_9$ 52. After the connection-making operation, the manual gate valve $SV_{11}$ 64 is closed, and the manual gate valve $SV_{28}$ 95 is opened to restore normal drilling.

In the tripping-and-drilling mode, the operation process is kept in consistency with that in parallel connection, and will not be repeated here.

In the well leakage mode and the overflow and well-kicking mode, the opening and closing of the respective electrically controlled throttle valves and gate valves are consistent with those in the normal drilling mode, and the flow channel of the drilling fluid is also kept in consistency with that in the normal drilling mode.

In the well leakage mode, the MPD intelligent control platform 87 automatically controls and regulates the opening degree of the electrically controlled throttle valve $V_1$ 39, sequentially reduces the wellhead pressure control values, and monitors the leakage loss in real time. The main operation is consistent with the parallel connection mode, except that the flow path of the drilling fluid and a transfer direction of the throttle pressure drop are different in series connection, and will not be repeated.

It should be additionally noted: if the slurry injection operation is required due to leakage loss without any slurry return in the series connection mode, the slurry pump 10 and the manual gate valve $SV_{28}$ 95 also need to be turned off and closed, and the manual gate valve $SV_{11}$ 64 needs to be opened, but the electrically controlled throttle valve $V_2$ 40 needs to be opened to open a slurry injection channel. The slurry pump 10 is then turned on; and the opening degrees of the electrically controlled throttle valves $V_1$ 39 and $V_2$ 40 on the back pressure compensation device are regulated to carry out the throttled slurry injection. The ground multi-parameter online monitoring system 86 monitors the level of the drilling fluid in the wellbore in real time; and when the slurry injection amount meets the requirements, the slurry pump is turned off, the manual gate valve $SV_1$ 64 is closed, the manual gate valve $SV_{28}$ 95 is opened, and the flow channel of the drilling fluid restores to the normal drilling mode.

In the overflow and well-kicking mode, the MPD intelligent control platform automatically controls the opening degrees of the electrically controlled throttle valve $V_1$ 39 and the hydraulically controlled throttle valve 67 to be reduced, and the wellhead back pressure values are increased sequentially; the bottom hole pressure is controlled, and the overflow and well-kicking conditions are monitored in real time until the overflow or well kicking disappears to restore to the normal drilling state. During throttled pressure control, the single-grade throttle control can be performed just by regulating the opening degree of the electrically controlled throttle valve $V_1$ 39, or the double-grade throttle control is performed by regulating the opening degrees of the electrically controlled throttle valve $V_1$ 39 and the hydraulically controlled throttle valve 67 at the same time. If the wellhead back pressure has risen to rated pressures of the ground simple throttle control manifold, the hydraulically controlled throttle valve 67 and the like, or exceeded a maximum wellhead pressure specified in the relevant standards for MPD, the intelligent control system 87 gives recommendations for ending the MPD and switching to the conventional well control process; and the on-site engineers decide the next step.

The invention claimed is:

1. A remote intelligent active drilling pressure control system, comprising a drilling pump, a rotary blowout preventer, a ground simple throttle control manifold, a wellhead back pressure compensation manifold, a graded filling device, a downhole storage-type pressure measuring device, a ground multi-parameter online monitoring system, a drilling hydraulic calculation system, a managed pressure drilling (MPD) intelligent control platform and a remote monitoring and control system, wherein the ground multi-parameter online monitoring system comprises a logging data center, a data integration and processing system, and a vertical pressure sensor $P_1$, a pressure control manifold pressure sensor $P_2$, a pressure control manifold pressure sensor $P_3$, a pressure control manifold pressure sensor $P_4$, a pressure control manifold pressure sensor Ps, a pressure control manifold pressure sensor $P_6$, a pressure control manifold pressure sensor $P_7$, a pressure control manifold pressure sensor $P_8$, a casing pressure sensor $P_9$, a gas-liquid separator exhaust pipe pressure sensor $P_{10}$, a drilling fluid inlet flowmeter $F_1$, a drilling fluid outlet flowmeter $F_5$, a gas-liquid separator outlet pipe flowmeter $F_4$, a pressure control manifold flowmeter $F_2$ and a pressure control manifold flowmeter $F_3$ which are respectively connected to the data integration and processing system through a wireless local area network, a gas-liquid separator exhaust pipe gas flowmeter $F_6$, a filling tank flowmeter $F_7$, a slurry return branch drilling fluid rheological monitoring device $R_1$, a gas-liquid separator outlet pipe drilling fluid rheological monitoring device $R_2$, and a gas-liquid separator exhaust pipe gas component monitoring device; the logging data center is connected to the data integration and processing system through a communication port; the MPD intelligent control platform is connected to the remote monitoring and control system; the data integration and processing system is respectively connected to the remote monitoring and control system, the drilling hydraulic calculation system and the MPD intelligent control platform through communication network equipment; and the downhole storage-type pressure measuring device is used to measure and store downhole temperatures and pressures, and is mounted in a drill collar at the upper part of a drill bit.

2. The remote intelligent active drilling pressure control system according to claim 1, wherein the ground simple throttle control manifold comprises: electrically controlled throttle valves, gate valves, and a throttling and diversion manifold system; the electrically controlled throttle valves and the gate valves are respectively mounted in the throttling and diversion manifold system; the gate valves comprise a manual gate valve $SV_3$, a manual gate valve $SV_8$, a manual gate valve $SV_9$, a manual gate valve $SV_{10}$, a manual gate valve $SV_{12}$, a manual gate valve $SV_{13}$, and a manual gate valve $SV_{15}$; the electrically controlled throttle valves comprise an electrically controlled throttle valve $V_1$, an electrically controlled throttle valve $V_2$ and an electrically controlled throttle valve $V_3$; the data integration and processing system is respectively connected to the electrically controlled throttle valve $V_1$, the electrically controlled throttle valve $V_2$ and the electrically controlled throttle valve $V_3$; the throttling and diversion manifold system comprises a branch I, a branch II, a branch III, a branch IV and a branch V; the branch I, the branch II and the branch III are connected through a tee joint $T_6$; the branch IV is connected to the branch II through a tee joint $T_7$; the branch V is connected to the branch III through a tee joint $T_5$;

the pressure control manifold flowmeter $F_3$, the manual gate valve $SV_{15}$ and the pressure control manifold pressure sensor $P_8$ are mounted on the branch I; the manual gate valve $SV_{15}$ is connected to a well control throttle manifold through a tee joint $T_8$; the data integration and processing system is respectively connected to the pressure control manifold flowmeter $F_3$ and the pressure control manifold pressure sensor $P_8$;

the electrically controlled throttle valve $V_2$, the pressure control manifold flowmeter $F_2$, the manual gate valve $SV_{13}$, the pressure control manifold pressure sensor $P_4$ and the pressure control manifold pressure sensor Ps are mounted on the branch II; the manual gate valve $SV_{13}$ is connected to the tee joint $T_7$; the pressure control manifold pressure sensor $P_4$ and the pressure control manifold pressure sensor Ps are respectively mounted on both ends of the electrically controlled throttle valve $V_2$; the data integration and processing system is respectively connected to the electrically controlled throttle valve $V_2$ and the pressure control manifold flowmeter $F_2$;

the electrically controlled throttle valve $V_1$ and the manual gate valve $SV_9$ are mounted on the branch III; the pressure control manifold pressure sensor $P_6$ and the pressure control manifold pressure sensor $P_7$ are respectively mounted on both ends of the electrically controlled throttle valve $V_1$; the data integration and processing system is respectively connected to the electrically controlled throttle valve $V_1$, the pressure control manifold pressure sensor $P_6$ and the pressure control manifold pressure sensor $P_7$;

the manual gate valve $SV_3$, the manual gate valve $SV_{12}$, the electrically controlled throttle valve $V_3$, the pressure control manifold pressure sensor $P_2$ and the pressure control manifold pressure sensor $P_3$ are mounted on the branch IV; the manual gate valve $SV_3$ is connected to the well control throttle manifold through a tee joint $T_4$; the pressure control manifold pressure sensor $P_2$ and the pressure control manifold pressure sensor $P_3$ are respectively mounted on both ends of the electrically controlled throttle valve $V_3$; the data integration and processing system is respectively connected to the electrically controlled throttle valve $V_3$, the pressure control manifold pressure sensor $P_2$ and the pressure control manifold pressure sensor $P_3$; and the manual gate valve $SV_8$ and the manual gate valve $SV_{10}$ are mounted on the branch V; and the manual gate valve $SV_{10}$ is connected to a gas-liquid separator through a four-way joint $SC_4$.

3. The remote intelligent active drilling pressure control system according to claim 2, wherein the wellhead back pressure compensation manifold comprises: a drilling team slurry pump, a back pressure diversion manifold, and a manual gate valve $SV_{11}$; the back pressure diversion manifold comprises a branch $V_1$ which is connected to the drilling team slurry pump through a four-way joint $SC_1$, and a branch VII that connects a four-way joint $SC_1$ and a tee joint $T_7$; a manual gate valve $SV_{11}$ is mounted on the branch VII; the manual gate valve $SV_{11}$ is sequentially connected to the branch II, the branch III and the branch V of the ground simple throttle control manifold through the tee joint $T_7$; and the branch V is connected to a vibrating screen through the four-way joint $SC_4$, or connected to the vibrating screen through the four-way joint $SC_4$ via the gas-liquid separator.

4. The remote intelligent active drilling pressure control system according to claim 3, wherein the graded filling device comprises a slurry suction pump, a filling tank, a feeder, a mixer, a filling tank electrically controlled throttle valve $V_4$, a feeding control system, a filling tank flowmeter $F_7$, a slurry suction pipeline, and a slurry injection pipeline; the filling tank is mounted on the slurry tank, and is connected with the slurry tank through the slurry suction pipeline; the filling tank is connected with a water pipeline on the drilling team slurry pump through the slurry injection pipeline; the slurry suction pump is mounted on the slurry suction pipeline; the filling tank electrically controlled throttle valve $V_4$ and the filling tank flowmeter $F_7$ are respectively mounted on the slurry injection pipeline; the mixer, the feeder and the feeding control system are respectively mounted on the filling tank; and the feeding control system is respectively connected with the mixer, the feeder and the slurry suction pump, and is connected with the MPD intelligent control platform through communication equipment.

5. A remote intelligent active drilling pressure control method which is implemented by the remote intelligent active drilling pressure control system according to claim 3, comprising the following steps:
S1: pre-inputting drilling parameters and engineering technical data to the MPD intelligent control platform prior to drilling,
the drilling parameters comprising a well category, a well type, a well depth, a well body structure, a well trajectory, a displacement, a drilling pressure, a rotational speed, formation lithology, drilling fluid density and viscosity, and reservoir parameters, wherein the pre-input data of the drilling parameters is derived from a drilling engineering design process; the engineering technical data comprises formation's three-pressure profiles, fracture parameters and plugging parameters, and the pre-input data of the engineering technical data is derived from the drilling engineering design and engineering calculation and analysis software;
S2: entering the MPD construction operation, enabling ground multi-parameter real-time monitoring, and entering an intelligent identification operation mode: opening the manual gate valve $SV_1$, the manual gate valve $SV_2$, the manual gate valve $SV_3$, the manual gate valve $SV_{15}$ and the manual gate valve $SV_{10}$ first; closing the manual gate valve $SV_6$ (34), the manual gate valve $SV_{11}$, the manual gate valve $SV_{16}$ (72) and the manual gate valve $SV_{26}$ to enter a pressure control mode; turning on the ground multi-parameter online monitoring system, the MPD intelligent control platform and the remote monitoring and control system, wherein the ground multi-parameter online monitoring system starts to collect monitoring data in real time, the drilling hydraulic calculation system calculates a bottom hole pressure in real time, and the MPD intelligent control terminal performs identification based on the collected well depth, hook load, drilling pressure, rotational speed, vertical pressure, casing pressure, drilling fluid inlet and outlet density and flow rate, and monitoring data for gas measurement values, and judges a drilling operation modes in real time, supplemented by manual confirmation, wherein
the drilling operation modes are divided into a normal drilling mode, a connection-making mode, a tripping-and-drilling mode, and a complex working mode, the complex working mode comprising a well leakage mode, and an overflow and well-kicking mode;
S3: carrying out a plugging operation while drilling to expand a "drilling safety density window" of a formation:
before the drilling operation encounters a leakage-prone formation, adding a while-drilling anti-leakage plugging agent to the pumped drilling fluid to expand the "drilling safety density window" of the formation, wherein the selection and ratio of the anti-leakage plugging agent are determined according to the leakage loss type of the leakage-prone formation and corresponding fracture parameters, and the fracture parameters are analyzed and calculated by the engineering calculation and analysis software installed in the expert workstation in the remote monitoring and control system before MPD;
further, a multi-slug graded plugging operation is carried out in the case of well leakage to form a dense and high-strength plugging zone and expand the "drilling safety density window" of the formation;
a principle of the multi-slug graded plugging operation comprises: grading plugging slurry according to the characteristics of formation fractures and particle sizes of plugging materials, and then injecting the plugging slurry into a wellbore in batches, so that the plugging materials enter the formation fractures in a graded and orderly manner to form a dense and effective plugging layer;
in the multi-slug graded plugging operation, the large-particle plugging material injected first forms a bridge at a throat position of the fracture, the second-grade plugging material is sequentially injected for filling, and the third-grade plugging material injected last is supplemented to form a dense plugging layer;
the configuration and pumping of the anti-leakage plugging agent and multi-slug graded plugging fluid are automatically configured and pumped by the graded filling device controlled by the MPD intelligent control terminal;
S4: intelligently regulating wellbore pressures under different operation modes, wherein the ground simple throttle control manifold is connected in parallel with the well control throttle manifold:
in the normal drilling mode: the drilling fluid returns through a side outlet of the rotary blowout preventer, flows through the branch IV, the branch II, the branch III and the branch V of the ground simple throttle control manifold in sequence, enters the gas-liquid separator through the four-way joint $SC_4$, and then returns to the slurry tank after the solid control by the vibrating screen; the electrically controlled throttle valve $V_2$ and the electrically controlled throttle valve $V_3$ are fully opened; an opening degree of the electrically controlled throttle valve $V_1$ is regulated to a preset pressure control value so as to maintain MPD;
in the connection-making mode: the manual gate valve $SV_1$ is opened; the manual gate valve $SV_{28}$ is closed; a flow channel on the wellhead back pressure compensation manifold is opened; the drilling fluid enters the wellhead back pressure compensation manifold through the four-way joint $SC_1$, flows through the branch $V_1$, the branch VII, the branch II, the branch III and the branch V of the back pressure diversion manifold in sequence, then enters the gas-liquid separator through the four-way joint $SC_4$, and then returns to the slurry tank after the solid control by the vibrating screen; the opening degrees of the electrically controlled throttle valve $V_1$, the electrically controlled throttle valve $V_2$ and the electrically controlled throttle valve $V_3$ are regulated by taking a preset back pressure compensation value as a benchmark to perform throttling and pressure control for back pressure compensation; the preset back pressure compensation value is an annulus circulation pressure loss calculated by the drilling hydraulic calculation system; at the end of the connection-making operation, the manual gate valve $SV_{11}$ is closed, and the manual gate valve $SV_{28}$ is opened to restore normal drilling;
in the tripping-and-drilling mode: a drilling team slurry pump is turned off, the remote intelligent active drilling pressure control system is always on and working, and the level of the annulus drilling fluid is monitored in real time through the ground multi-parameter online monitoring system; if the fluid level is abnormal, the drilling team slurry pump is turned on to perform slurry injection or back pressure compensation operation according to the abnormal fluid level;

in the well leakage mode: the opening degree of the electrically controlled throttle valve $V_1$ is regulated; a wellhead pressure control value is reduced gradually, and the leakage loss situation is monitored in real time; if the electrically controlled throttle valve $V_1$ has been fully opened and the well leakage still occurs when the wellhead back pressure has dropped to zero, the MPD intelligent control system intelligently regulates a displacement of the drilling fluid until the well leakage no longer occurs; if the well leakage still occurs when the displacement has been reduced to a minimum displacement required for wellbore purification, the MPD intelligent control system will automatically give a prompt to reduce the displacement of the drilling fluid or to carry out the plugging operation, provide a plugging plan and a recommended plan for main plugging parameters, and carry out the multi-slug graded plugging operation after manual confirmation;

if the slurry injection operation is required due to leakage loss without any slurry return, the drilling team slurry pump is turned off, the manual gate valve $SV_{28}$ is closed, and the manual gate valve $SV_1$ is opened; the drilling team slurry pump is then turned on; the opening degrees of the electrically controlled throttle valve $V_1$ and the electrically controlled throttle valve $V_3$ are regulated to carry out the slurry injection operation; the ground multi-parameter online monitoring system monitors the level of the drilling fluid in real time; when the slurry injection amount meets the requirements of the slurry injection operation, the drilling team slurry pump is turned off, the manual gate valve $SV_1$ is closed, the manual gate valve $SV_{28}$ is opened, and the flow channel of the drilling fluid restores to the normal drilling mode; and in the overflow and well-kicking mode: the opening degrees of the electrically controlled throttle valve $V_1$, the electrically controlled throttle valve $V_2$ and the electrically controlled throttle valve $V_3$ are reduced, and the wellhead back pressure value is increased gradually; the bottom hole pressure is controlled, and the overflow and well-kicking conditions are monitored in real time until the overflow or well-kicking disappears to restore to the normal drilling state; if the wellhead back pressure has risen to a maximum wellhead pressure specified by MPD standards, the MPD intelligent control system gives a prompt to end the MPD operation and switch to the conventional well control process, and on-site drilling engineers finally decide the next step; and if it is determined to end the MPD operation, the hydraulically controlled throttle valve is opened and the manual gate valve $SV_{23}$ is closed.

6. The remote intelligent active drilling pressure control method according to claim 5, wherein the throttle pressure control and back pressure compensation operation further comprises: performing single-stage throttling by regulating the opening degree of the electrically controlled throttle valve $V_1$, or performing multi-stage throttling by regulating the opening degrees of the electrically controlled throttle valve $V_1$, the electrically controlled throttle valve $V_2$ and the electrically controlled throttle valve $V_3$; and the MPD intelligent control system prioritizes single-stage throttling, but when a throttling pressure drop generated by the single-stage throttling is close to a maximum allowable throttle pressure drop of the electrically controlled throttle valve $V_1$, automatically turns on the multi-stage throttling.

7. The remote intelligent active drilling pressure control method according to claim 5, wherein a specific construction process of the multi-slug graded plugging operation is as follows:
Step 1: the MPD intelligent control system controls a suction pump to be turned on to pump the drilling fluid in the slurry tank of a set volume into the filling tank, and grades plugging slurry according to screened plugging formulas, wherein first-grade large-grained elastic and rigid mixed materials are added first and mixed well; the concentration of the plugging slurry in the filling tank is automatically calculated according to the amount of the drilling fluid in the filling tank and the addition amounts of the plugging materials;
Step 2: after the plugging slurry in the filling tank is prepared well, the drilling team slurry pump is turned on, and the displacement of the pump is given by the MPD intelligent control system;
Step 3: the MPD intelligent control system controls the opening degree of an electrically controlled throttle valve $V_4$ of the filling tank, and adjusts an injection flow rate of the first-grade plugging slurry to control the concentration of the plugging slurry injected into the wellbore;
Step 4: after the pumping of the first-grade plugging slurry is completed, the drilling team slurry pump is turned off, and the operations of Steps 1, 2, and 3 are repeated to complete the filling and pumping of the second- and third-grade plugging materials in sequence;
Step 5: after all grades of plugging slurry are pumped, the electrically controlled throttle valve $V_4$ of the filling tank is closed, and the drilling fluid is continuously pumped to replace the slurry; and
formulas of the plugging slurry at all grades need to be stored in the drilling intelligent control system in advance, and automatically screened according to the monitored leakage loss; and the formulas of the plugging slurry can also be manually screened by field engineers.

8. The remote intelligent active drilling pressure control system according to claim 1, wherein the drilling hydraulic calculation system comprises a steady-state calculation module and a transient calculation module; the steady-state calculation module is configured to perform steady-state calculation on single-phase fluid or gas-liquid two-phase fluid of drilling fluid in an annulus and the drill string according to a preset steady-state calculation path to obtain steady-state drilling parameters on the preset steady-state calculation path; and the transient calculation module is configured to perform transient calculation on the gas-liquid two-phase fluid in the annulus and the drill string according to a preset transient calculation path to obtain transient drilling parameters on the preset transient calculation path.

9. The remote intelligent active drilling pressure control system according to claim 1, wherein the MPD intelligent control platform comprises: an MPD intelligent control terminal, a throttle control cabinet, a back pressure compensation control cabinet and a drilling server; the MPD intelligent control terminal is respectively connected with the throttle control cabinet and the back pressure compensation control cabinet; the throttle control cabinet is respectively connected with the electrically controlled throttle valve $V_1$, the electrically controlled throttle valve $V_2$, the electrically controlled throttle valve $V_3$ and a hydraulically controlled throttle valve on the well control throttle manifold; the back pressure compensation control cabinet is respectively connected with the electrically controlled throttle valve $V_1$ and the electrically controlled throttle valve $V_2$ which are connected and mounted with the wellhead back pressure compensation manifold; the MPD intelligent control terminal is connected to the drilling server; the MPD intelligent control terminal comprises an intelligent control module and an artificial control module; the intelligent control module is configured to learn and train drilling data collected by the ground multi-parameter online monitoring system through a machine learning intelligent algorithm to generate a pressure regulation instruction sample library under multiple working conditions of MPD, and perform intelligent pressure control according to the online monitoring data; and the artificial control module is configured to perform intelligent remote closed-loop control on a drilling wellbore pressure according to instructions from MPD staff.

10. The remote intelligent active drilling pressure control system according to claim 1, wherein the remote monitoring and control system comprises: a remote monitoring center, a data center, an expert workstation, a control center and a monitoring server; the remote monitoring center is connected with the MPD intelligent control system through communication network equipment; the data center is respectively connected to the remote monitoring center, the expert workstation and the monitoring server; the expert workstation is connected to the control center; the control center is connected with the MPD intelligent control terminal; the data center is configured to store all the monitored data, and store all data after drilling has been performed, as well as to train the machine learning intelligent algorithm of the MPD intelligent control terminal; and the expert workstation is equipped with engineering calculation analysis software, which is configured to directly transmit expert opinions and instructions to the MPD intelligent control terminal through the control center.

* * * * *